(12) United States Patent
Boulanger et al.

(10) Patent No.: US 10,656,777 B1
(45) Date of Patent: May 19, 2020

(54) CONCEALED USER INTERFACES

(71) Applicants: Catherine N. Boulanger, Palo Alto, CA (US); Felipe Bacim De Araujo E Silva, Sunnyvale, CA (US); Karlin Y. Bark, Menlo Park, CA (US); Seung Wook Kim, Cupertino, CA (US)

(72) Inventors: Catherine N. Boulanger, Palo Alto, CA (US); Felipe Bacim De Araujo E Silva, Sunnyvale, CA (US); Karlin Y. Bark, Menlo Park, CA (US); Seung Wook Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 15/933,980

(22) Filed: Mar. 23, 2018

Related U.S. Application Data

(60) Provisional application No. 62/526,765, filed on Jun. 29, 2017.

(51) Int. Cl.
  *G06F 3/0481* (2013.01)
  *G06F 3/0488* (2013.01)
  (Continued)

(52) U.S. Cl.
  CPC ......... *G06F 3/0481* (2013.01); *D03D 1/0088* (2013.01); *G06F 3/017* (2013.01); *G06F 3/041* (2013.01); *G06F 3/04886* (2013.01)

(58) Field of Classification Search
  CPC .......... G06F 3/016; G06F 3/017; G06F 3/041; G06F 3/0412; G06F 3/0414–04146; G06F 3/042–045; G06F 3/0481; G06F 3/04817; G06F 3/0482; G06F 3/0484; G06F 3/04842; G06F 3/0488; G06F 3/04886; G06F 2203/0382; G06F 2203/04102; G06F 2203/04105; G06F 2203/04809; D03D 1/0076–0088; B60K 35/00; B60K 2370/10–122; B60K 2370/143–1476; B60K 2370/15–1533; B60K 2370/164–166; B60K 2370/171; B60K 2370/18; B60K 2370/182; B60K 2370/191; B60K 2370/197; B60K 2370/199; B60K 2370/33–332; B60K 2370/339–39
  See application file for complete search history.

(56) References Cited

U.S. PATENT DOCUMENTS 9,092,766 B1 * 7/2015 Bedier ................. G06Q 20/204
9,158,445 B2 10/2015 Wong et al.
(Continued)

OTHER PUBLICATIONS

YouTube, "Light-emitting shirts!", Uploaded on Sep. 4, 2006, https://www.youtube.com/watch?v=Yd99gyE4jCk, Downloaded Mar. 14, 2018, 6 pp.
(Continued)

*Primary Examiner* — Nathan Danielsen
(74) *Attorney, Agent, or Firm* — Young Basile Hanlon & MacFarlane, P.C.

(57) ABSTRACT

One method includes receiving inputs from one or more input devices, and determining a user interest in use of the interface device based on the inputs. In response to the user interest, changing a state of the first interface device from a deactivated state in which the first interface device is concealed behind a surface to an activated state in which the first interface device emits light through the surface.

7 Claims, 17 Drawing Sheets

(51) Int. Cl.
*G06F 3/01* (2006.01)
*D03D 1/00* (2006.01)
*G06F 3/041* (2006.01)

(56) References Cited

U.S. PATENT DOCUMENTS

| | | | |
|---|---|---|---|
| 2004/0012570 A1* | 1/2004 | Cross | G06F 3/045 345/173 |
| 2005/0146076 A1 | 7/2005 | Alexander et al. | |
| 2006/0155429 A1* | 7/2006 | Boone | B60K 35/00 701/1 |
| 2008/0075368 A1* | 3/2008 | Kuzmin | G06F 3/04883 382/187 |
| 2008/0297726 A1* | 12/2008 | Rodriguez, Jr. | G03B 21/14 353/13 |
| 2008/0303796 A1* | 12/2008 | Fyke | G06F 3/0236 345/173 |
| 2011/0055729 A1 | 3/2011 | Mason et al. | |
| 2011/0191690 A1 | 8/2011 | Zhang et al. | |
| 2012/0240044 A1 | 9/2012 | Johnson et al. | |
| 2012/0249409 A1 | 10/2012 | Toney et al. | |
| 2013/0176250 A1* | 7/2013 | Lee | G06F 3/013 345/173 |
| 2015/0002406 A1* | 1/2015 | Small | G06F 3/041 345/173 |
| 2015/0307040 A1* | 10/2015 | Heyden | B60K 35/00 340/449 |
| 2015/0370320 A1* | 12/2015 | Connor | A61B 5/6831 345/173 |
| 2016/0176372 A1* | 6/2016 | Kim | G06K 9/00604 701/49 |
| 2017/0249059 A1* | 8/2017 | Houseworth | G06F 40/174 |

OTHER PUBLICATIONS

Enpundit, "Optical Camouflage Technology Allows You to 'See-Through' a Car's Backseat", http://enpundit.com/optical-camouflage-technology-allows-you-to-see-through-a-cars-backseat/, Downloaded Mar. 14, 2018, 4 pp.

Amazon.com, "Wooden Digital Alarm Clock, Touch Sound Activated Desk Clock Thermemeter / Timer / Calendar", https://www.amazon.com/gp/product/B01N03OQ09/, Downloaded Jun. 14, 2007, 9 pp.

* cited by examiner

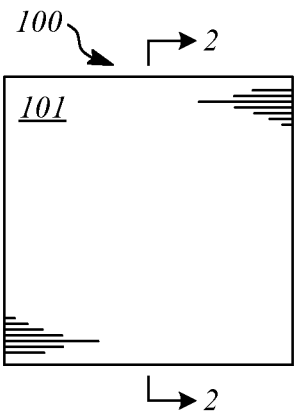 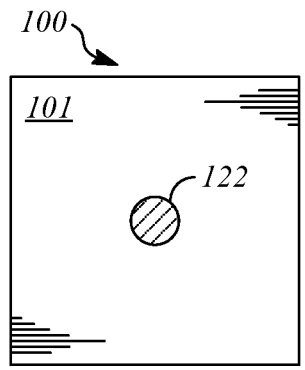 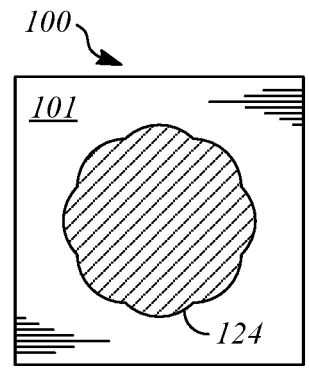
FIG. 1A  FIG. 1B  FIG. 1C
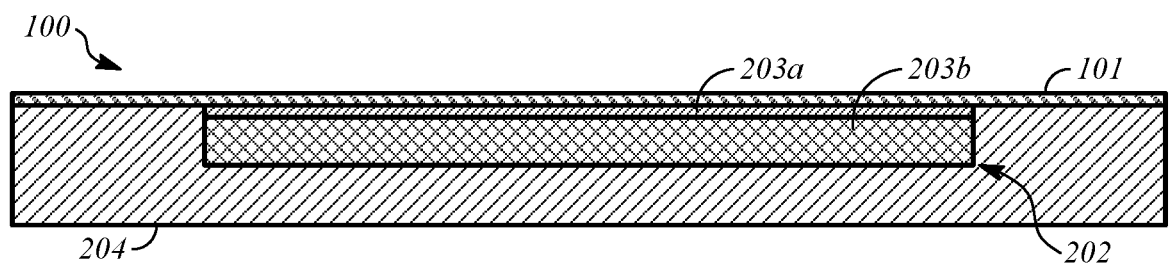
FIG. 2
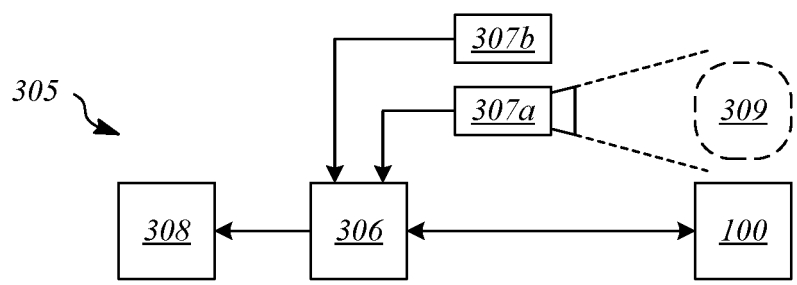
FIG. 3

CONCEALED USER INTERFACES

CROSS-REFERENCE TO RELATED APPLICATIONS

This application claims the benefit of U.S. Provisional Application No. 62/526,765, filed on Jun. 29, 2017, and entitled "Concealed User Interfaces," the content of which is incorporated herein by reference for all purposes.

TECHNICAL FIELD

The application relates generally to the field of user interfaces.

BACKGROUND

Electronic devices have been integrated into a broad array of goods. In some applications, visible user interfaces may detract from the aesthetics of an object, may distract users, or may make users feel less comfortable.

SUMMARY

One aspect of the disclosed embodiments is an apparatus that includes a surface, and an interface device having an input device and a display device. The interface device has a deactivated state in which the interface device is concealed behind the surface. The interface device has an activated state in which the interface device emits light through the surface. The input device is operable to sense gesture inputs made with respect to the surface.

Another aspect of the disclosed embodiments is an apparatus that includes a first surface, wherein the first surface is part of a seating assembly. The apparatus also includes an input device that is concealed behind the first surface, and a display device. The display device has a deactivated state in which the display device is concealed behind a second surface, and an activated state in which the display device emits light through the second surface. The input device is operable to control a user interface displayed by the display device when the display device is in the activated state.

Another aspect of the disclosed embodiments is an apparatus that includes a first surface, a first interface device, a first input device that outputs a signal indicative of a gaze angle of a user, and a controller. The first interface device has a deactivated state in which the first interface device is concealed behind the first surface. The first interface device has an activated state in which the first interface device emits light through the first surface. The controller is operable to switch the first interface device between the deactivated state and the activated state based on the gaze angle of the user.

BRIEF DESCRIPTION OF THE DRAWINGS

FIG. 1A is a front view illustration that shows a concealed user interface assembly in a deactivated state.

FIG. 1B is a front view illustration that shows the concealed user interface assembly in an activated state with a location indication output for display.

FIG. 1C is a front view illustration that shows a concealed user interface assembly in the activated state with a user interface output for display.

FIG. 2 is a cross-section view of the concealed user interface assembly taken across line 2-2 of FIG. 1A.

FIG. 3 is a block diagram that shows a system that includes the concealed user interface assembly.

DETAILED DESCRIPTION

Figure 4:
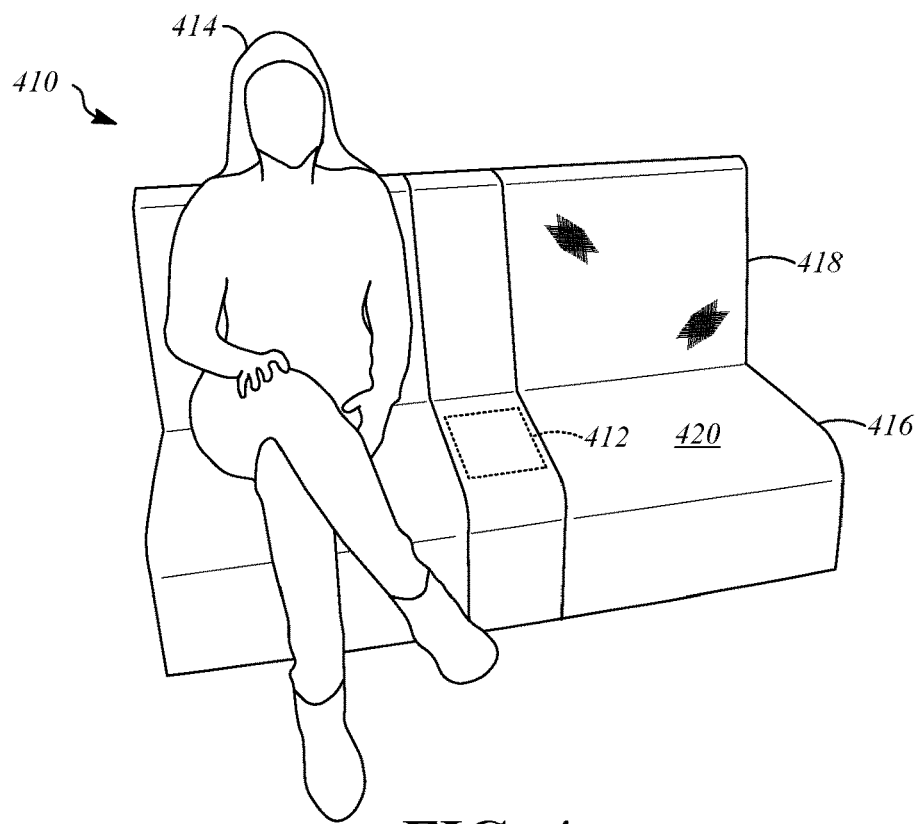
FIG. 4 is an illustration that shows a seating assembly that incorporates an interface device.

The disclosure herein is directed to apparatuses, systems, and methods in which user interface devices are concealed behind surfaces. When the user interfaces devices are deactivated, no portions of the devices are visible, and the surface may appear to be free from controls, computing devices, or other structures that allow interaction with computers and other machines. When the user interface devices are activated, they emit light that passes through the surfaces to relay information to users and to allow the user to interact with and control various systems and devices. Thus, for example, a touch screen user interface may be concealed behind a seating surface or a wall surface, such that its presence is not perceived by users when it is in a deactivated state and not emitting light that passes through the seating surface or the wall surface.

FIGS. 1A-1C are perspective view illustrations that show a concealed user interface assembly 100 according to an example. The hardware configuration of the concealed user interface assembly 100 is an example of a hardware configuration that can be used in a number of assemblies that include concealed interface devices, as will be described herein.

The concealed user interface assembly 100 has a deactivated state (FIG. 1A) and an activated state (FIGS. 1B and 1C). In the deactivated state, only a surface 101 is externally visible. The concealed user interface assembly 100 may be free from visible user interface device components when in the deactivated state. In the activated state, the concealed user interface assembly 100 can display, as examples, a location indication 122 (FIG. 1B), or a user interface 124 (FIG. 1C) by emission of light through the surface 101, as will be explained herein.

FIG. 2 is a cross-section view of the concealed user interface assembly 100 taken across line 2-2 of FIG. 1A. The concealed user interface assembly 100 includes the surface 101, an interface device 202 that includes an input sensor 203a and a display device 203b, and a supporting structure 204.

The surface 101 is visible from the exterior of the concealed user interface assembly 100 and is exposed to the environment around the concealed user interface assembly 100. The surface 101 is a thin material layer that obstructs visibility of the interface device 202 when the interface device 202 when it is in the deactivated state. When the interface device 202 is in the activated state, at least a portion of the light emitted by the interface device 202 passes through the surface 101. To allow transmission of emitted light, the surface 101 can be formed from a material that is partially translucent at the thickness used for the surface 101, or the surface 101 can be formed from a material having a pore structure that extends through the surface 101. Examples of suitable materials for the seating surface 420 include textile materials, vinyl materials, faux leather materials including polyurethane faux leather materials and polyvinyl chloride faux leather materials, and thin wood veneers. In another example, the material for the seating surface 420 can be a layer of a coating material such as paint on a transparent substrate such as glass or plastic. In another example, the material for the seating surface 420 can be a thin layer of a metal such as aluminum, by deposition of the thin layer of metal on a transparent substrate such as glass or plastic.

The interface device 202 is disposed behind the surface 101. The interface device 202 may be in contact with the surface 101 or may be separated from the surface 101 by a layer of an optically transmissive material such as a layer of plastic, a layer of glass, or a layer of an optical filter material that affects passage of light emitted by the interface device 202. The interface device 202 is operable to output information using patterns, colors, and/or intensity of emitted light, and is operable to sense user inputs in order to allow user control of one or more systems, as will be explained herein. The interface device 202 may be a rigid structure, a semi-rigid structure, or a flexible structure.

Herein, emission of light by the interface device 202 may be referred to as occurring through a surface portion. The term surface portion refers to the part of the surface that is positioned adjacent to the interface device. As used herein, the terms "first surface portion" and "second surface portion" may refer to different parts of a single surface or may refer to parts of different surfaces.

The input sensor 203a can be a touch-based or proximity based detector that is able to detect contacting gestures and/or non-contacting gestures. As examples, the input sensor 203a can be a capacitive touch sensing panel, a resistive touch sensing panel, an infrared sensor, or an optical sensor. The input sensor 203a outputs information in response to gestures. As examples, the information output by the input sensor 203a can include a gesture location information that describes a location or locations associated with the gesture (e.g., X and Y coordinates), and gesture intensity information that describes an intensity or intensities associated with the gesture (e.g., pressure values).

The display device 203b is any device or combination of devices that can be controlled to provide information to a user. As one example, the display device 203b can be a display screen that is operable to display images and/or text, such as an LCD display screen, an LED display screen, or an OLED display screen. As another example, the display device 203b can be a single light-emitting diode or an array of light emitting diodes, such as RGB light-emitting diodes having variable colors and/or intensities that can be controlled. Inputs received using the input sensor 203a can cause changes in the content displayed by the display device 203b, such as by changing the color and/or intensity of illumination displayed by the display device 203b, changing images displayed by the display device 203b, or changing text displayed by the display device 203b.

The supporting structure 204 supports and interconnects the surface 101 and the interface device 202. As an example, the interface device 202 may be disposed in a recess formed in the supporting structure 204. The supporting structure 204 may surround the interface device 202 and be connected to the surface 101 near an outer periphery of the interface device 202 to secure the interface device 202 between the surface 101 and the supporting structure 204.

FIG. 3 is a block diagram that show a system 305 that includes the concealed user interface assembly 100. The system 305 also includes a controller 306, a vision sensor 307a, an audio sensor 307b (e.g., a microphone), and an external system 308. As examples, the external system 308 can be a climate control system, an audio playback system, a video display system, a lighting control system, a navigation system, or an automotive control system. Other types of external systems 308 can be incorporated in the system 305 to allow control by the controller 306.

The controller 306 is a computing device that is operable to receive input from and to send output to the interface device 202. For example, the controller 306 can include a processor, a memory, and program instructions that are stored in the memory that, when executed, allow the controller 306 to interact with the interface device 202 and perform the functions that are described herein.

The vision sensor 307a is operable to provide information to the controller 306 that represents the environment around the concealed user interface assembly 100. As one example, the vision sensor 307a can include a video camera that provides images that include the area around the concealed user interface assembly 100 to the controller 306. As another example, the vision sensor 307a can include a three-dimensional scanner, such as a structured-light 3D scanner, that provides information describing locations of surfaces and objects, such as a point cloud, to the controller 306. The information provided to the controller 306 by the vision sensor 307a can be used to identify the location of a user 309 relative to the interface device 202, including, as examples, the location of the hands and/or body of the user 309. The information provided to the controller 306 by the vision sensor 307a can be used for gaze detection, to determine a gaze angle for the user 309.

As will be described herein, the information provided to the controller 306 by the vision sensor 307a can be used to control activation and deactivation of the interface device 202, and can be used to determine what should be displayed by the interface device 202 when in the activated state. As one example, the location of the user 309 and/or the location of the hands of the user 309 can be used to activate or deactivate the interface device 202. As another example, the gaze angle for the user 309 can be used to activate or deactivate the interface device 202.

The audio sensor 307b is operable to capture audio inputs from the environment around the concealed user interface assembly 100. The audio inputs that are captured by the audio sensor 307b can include verbal commands from the user 309 (e.g. "lower the temperature") and non-command statements from the user 309 (e.g., "It's hot in here"). The audio inputs that are captured by the audio sensor 307b can be used to control activation and deactivation of the interface device 202, and can be used to determine what should be displayed by the interface device 202 when in the activated state.

The vision sensor 307a and the audio sensor 307b are examples of input devices that can provide information to the controller 306 so that the controller can use the information to make decisions. Other input devices can be used to provide information to the controller 306.

FIG. 4 is an illustration that shows a seating assembly 410 that incorporates an interface device 412. The interface device 412 may be similar to the interface device 202, and may be a portion of a system that is analogous to the system 305 of FIG. 3. A user 414, who may be referred to as a person, is shown seated upon the seating assembly 410 next to the interface device 412. As will be explained herein, the interface device 412 is concealed and has a deactivated state, in which a user interface is not presented to the user 414, and an activated state, in which the user interface is presented to the user.

The seating assembly 410 is an example of an object that the interface device 412 can be incorporated in. In the illustrated example, the seating assembly 410 is a bench-style seat having a width that can accommodate two or three persons seated side by side. The seating assembly 410 includes a seat base 416 and a seat back 418. The seat base 416 is the portion of the seating assembly 410 that is positioned under the user 414 to support the pelvis and upper legs of the user 414. The seat back 418 is the portion of the seating assembly 410 that is positioned behind the user 414 to support the torso of the user 414.

The seating assembly 410 includes exterior surfaces, such as a seating surface 420 that is part of the seat base 416. The seating surface 420 and other surfaces of the seating assembly 410 can be visible to the user 414 and exposed to the environment around the seating assembly 410. The seating surface 420 is typically a thin material layer that is disposed over structural members and cushions of the seating assembly 410, as will be described further herein. The material used from the seating surface 420 can be a material that is typical of seating applications such as upholstery materials. Examples of suitable materials for the seating surface 420 include textile materials, vinyl materials, and faux leather materials including polyurethane faux leather materials and polyvinyl chloride faux leather materials.

The interface device 412 is configured so that it can be concealed by a portion of an object, such as the seating assembly 410. In the illustrated example, the interface device 412 is disposed behind the seating surface 420 of the seating assembly 410. The interface device 412 includes a light-emitting display device that is used to cause display of the user interface. The interface device 412 may also include a sensing device that is operable to sense user interaction with the interface device 412. Examples of hardware configurations for the interface device 412 will be discussed herein.

The interface device 412 is depicted in FIG. 4 in broken lines, indicating that it is not visible. The interface device 412 is not visible because it is concealed behind the seating surface 420 and is in the deactivated state, in which the interface device 412 is not causing light to be emitted. When the interface device 412 is in the deactivated state, the seating assembly 410 may be free from visible evidence indicating that an interface device 412 is present.

Figure 5:
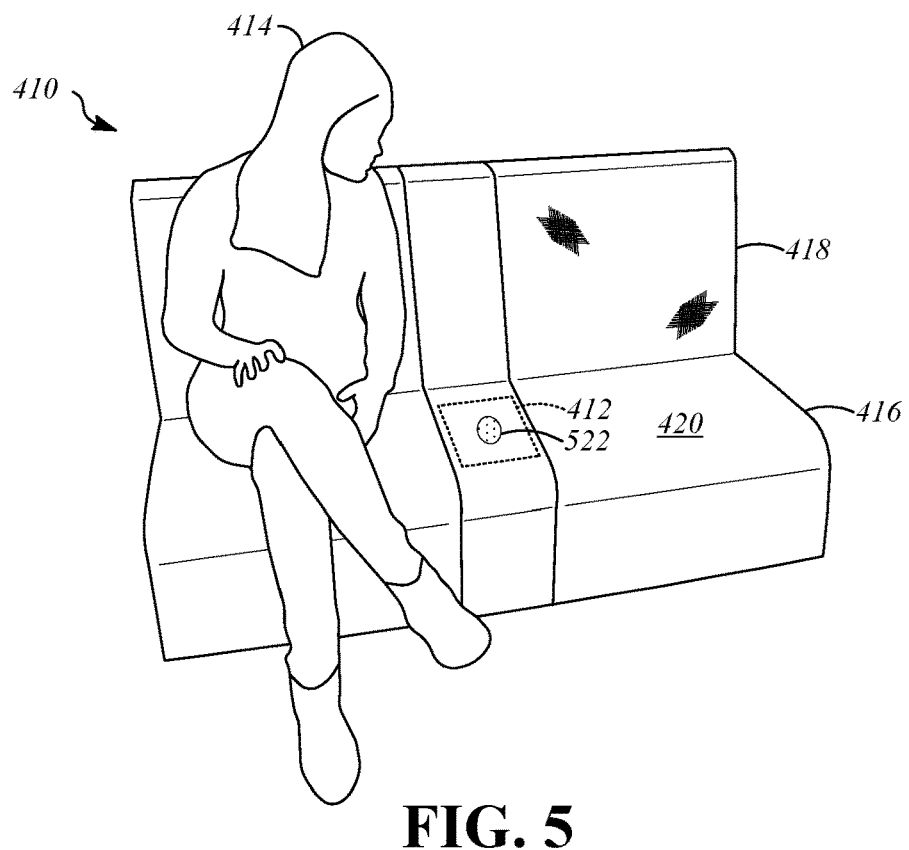
FIG. 5 is an illustration that shows the seating assembly and the interface device, including output of a visible location indication by the interface device.

FIG. 5 is an illustration that shows the seating assembly 410 and the interface device 412, including output of a visible location indication 522 by the interface device 412. In one implementation, the interface device 412 is in the activated state, and emits light such that the visible location indication 522 is visible to the user. The visible location indication 522 is a visible feature that is intended to help the user realize that the interface device 412 is present and can be used to display the user interface. The visual style and manner of presentation of the visible location indication 522 can be selected such that it is not obtrusive, but instead draws only enough attention to itself to fulfill the function of indicating the location of the interface device 412.

The visible location indication 522 can be output for display in response to a first event, and the visible location indication 522 can be displayed for a limited time period after the first event occurs. The first event signifies a possibility that the use may want or need to utilize the interface device 412. As examples, the first event can be entry into an area near the interface device 412 by the user 414, a verbal statement by the user 414, a gesture (e.g., hand motion) by the user, or a change in the gaze angle of the user toward an area near the interface device 412.

As one example, the visible location indication 522 can be displayed by the interface device 412 when the user 414 approaches the seating assembly 410. As another example, the visible location indication 522 can be displayed by the interface device 412 when the user 414 sits on the seat base 416 of the seating assembly 410. As another example, the visible location indication 522 can be displayed by the interface device 412 when the user 414 moves from a first seating position relative to the seat base 416 to a second seating position relative to the seat base 416. As another example, the visible location indication 522 can be displayed by the interface device 412 when the user 414 moves their hand toward the interface device 412. As another example, the visible location indication 522 can be displayed by the interface device 412 when the user 414 speaks a verbal command that is recognized by the interface device 412. As another example, the visible location indication 522 can be displayed by the interface device 412 when the user speaks a non-command statement that relates to a system that can be controlled by the interface device 412. As another example, the visible location indication 522 can be displayed by the interface device 412 when the user 414 turns their head to look in a direction that corresponds to the area in which the interface device 412 is located.

In an alternative implementation, a non-visible location indication can be output by the interface device 412 in response to the first event. The non-visible location indication can be, as examples, a sound that emanates from the interface device 412, or a vibration that emanates from the interface device 412.

Figure 6:
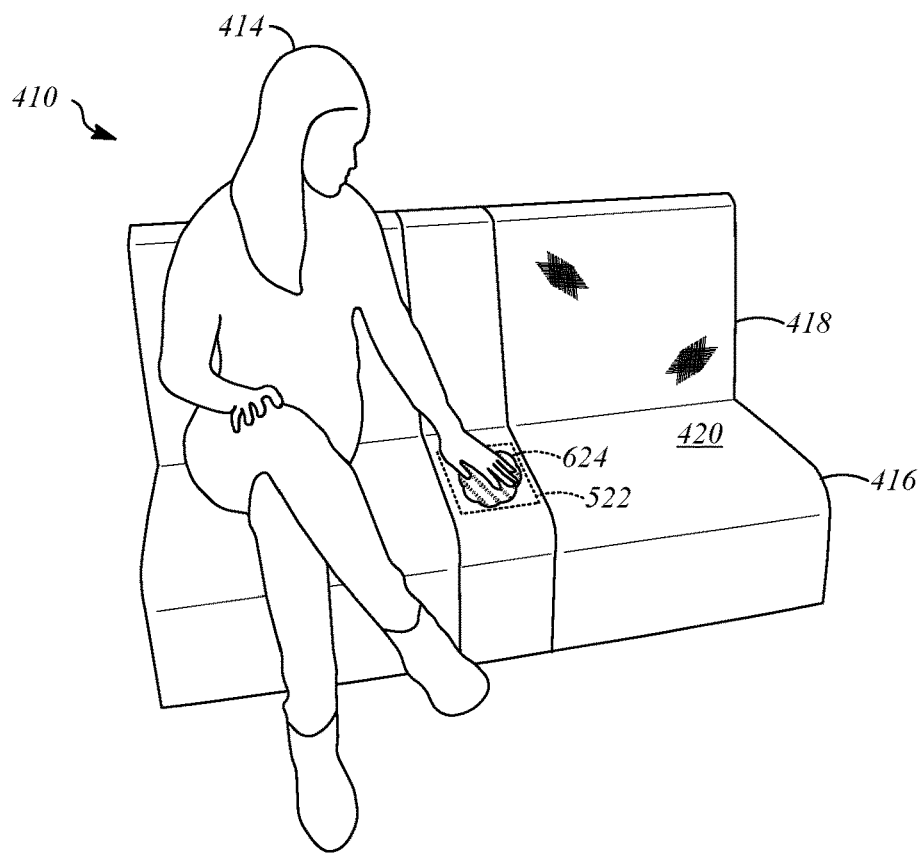
FIG. 6 is an illustration that shows the seating assembly and the interface device, including output of a user interface by the interface device.

FIG. 6 is an illustration that shows the seating assembly 410 and the interface device 412, including output of a user interface 624 by the interface device 412. The user interface 624 is visible because the interface device 412 is in the active state and is emitting light, and a portion of the emitted light passes through the seating surface 420 of the seating assembly 410, as will be described further herein.

The user interface 624 can be displayed in response to a second event. The second event can be, as examples, interaction with the interface device 412 by the user 414, a verbal command that requests display of specific information by the user interface 624, or a verbal command that requests display of the user interface 624. The second event can also be activated by a control system without a request or action by the user, as will be explained further herein. Activation of the user interface 624 can be performed by the control system, for example, when information is required by the control system from the user. The second event can also be a transfer of the user interface 624 to the interface device 412 from a different interface device by a gesture input of by a verbal input, as will be described further herein.

When the user interface 624 is displayed by the interface device 412, the user 414 can interact with the user interface 624. For example, gesture inputs made by the user 414 relative to the user interface 624 can be sensed by sensing components that are incorporated in the user interface 624. The interface device 412 can utilize these inputs to control operation of other devices, such as audio playback systems, video playback systems, climate control systems, and navigation systems.

Figure 7:
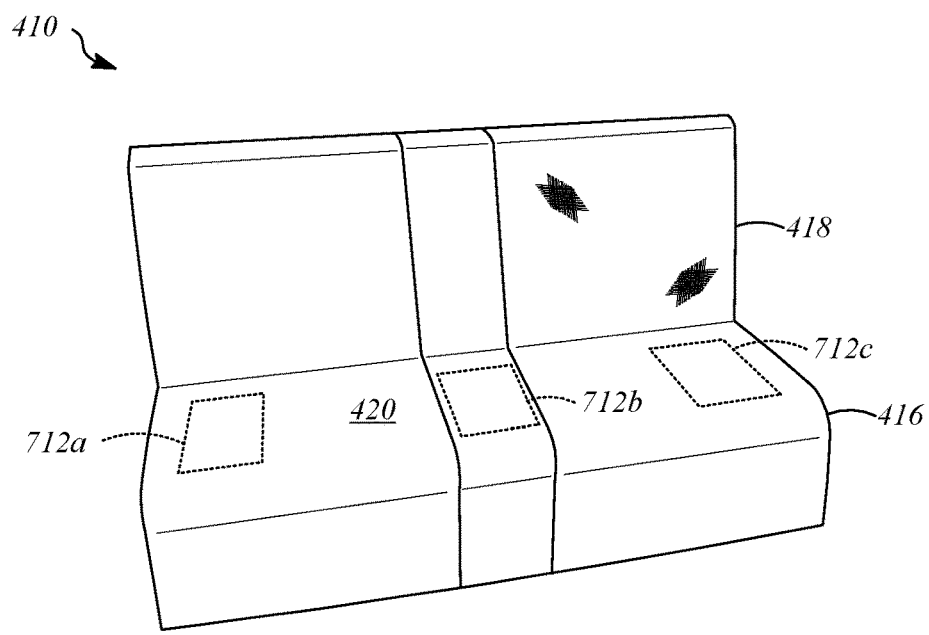
FIG. 7 is an illustration that shows the seating assembly according to an implementation in which the seating assembly includes more than one interface device.

FIG. 7 is an illustration that shows the seating assembly 410 according to an implementation in which the seating assembly 410 includes more than one interface device. In the illustrated example, the seating assembly 410 includes a first interface device 712a, a second interface device 712b, and a third interface device 712c that are each configured in the manner described with respect to the interface device 412, including display of the visible location indication 522 and the user interface 624. The first interface device 712a, a second interface device 712b, and a third interface device 712c are positioned at spaced locations along the seating surface 420 of the seat base 416.

Figure 8:
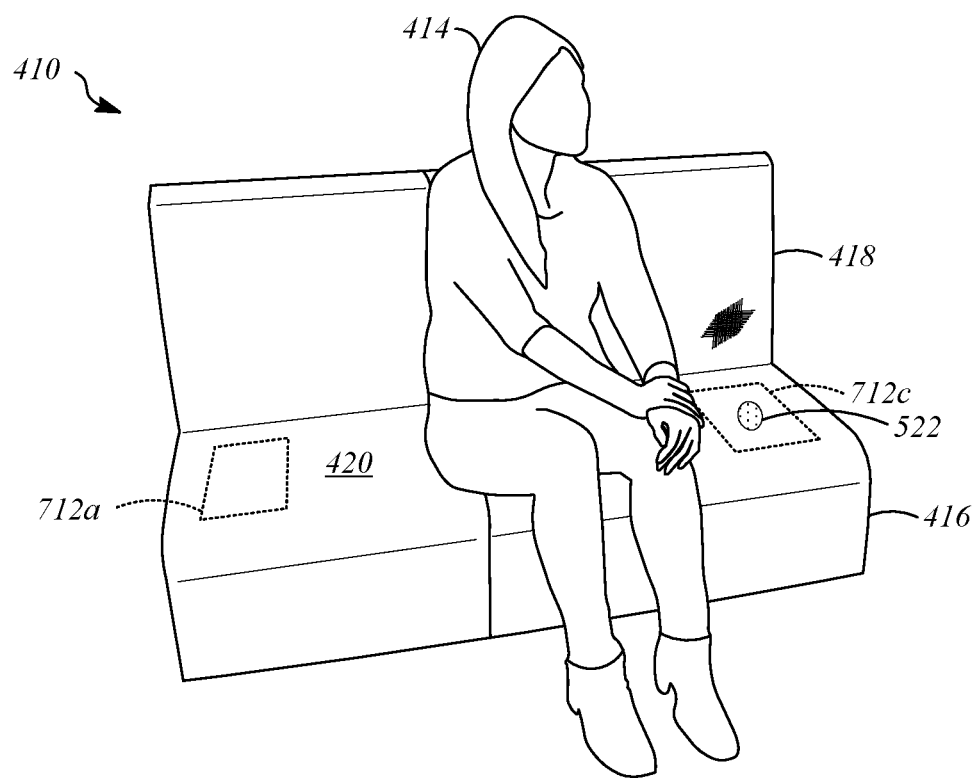
FIG. 8 shows the seating assembly of FIG. 7 including output of the visible location indication by one of the interface devices.

FIG. 8 shows the seating assembly of FIG. 7 including output of the visible location indication by one of the interface devices. In the illustrated example, the third interface device 712c is displaying the visible location indication 522 and can be activated to cause display of the user interface 624 in the manner described with respect to the interface device 412.

In implementations in which the seating assembly 410 includes more than one interface device, one or more of them can be selected for activation. Selection between interface devices can be performed using, for example, the sensors and inputs described with respect to the system 305, such as the vision sensor 307a.

One example of interface device selection is based on a seating position of the user 414. Visibility and distance of interface devices can be used as factors for this selection. In the illustrated example, the second interface device 712b (FIG. 7) is not visible because the seating position of the user 414 obstructs visibility of the second interface device 712b, so it is not selected. The third interface device 712c is selected because it is closer to the user 414 than any other visible interface device, such as the first interface device 712a.

In another example of interface device selection, more than one interface device, such as the first interface device 712a and the third interface device 712c can display the visible location indication 522. The user 414 can select which one to use for output of the user interface 624, such as by making a selection gesture such as moving to the area near one of the first interface device 712a or the third interface device 712c.

Another example of interface device selection includes transferring display of the user interface 624 between interface devices, such as from the third interface device 712c to the first interface device 712a. As one example transferring display of the user interface 624 from the third interface device 712c to the first interface device 712a can be performed by a first gesture input by the user 414 at the third interface device 712c that initiates the transfer and subsequently by a second gesture input at the first interface device 712a that completes the transfer. The first gesture input is indicative of the intention of the user 414 to initiate a transfer and also indicates that the user interface 624 that is displayed by the third interface device 712c is the one that the user 414 wishes to transfer to a different interface device. The second gesture input indicates that the user 414 has selected the first interface device 712a as the destination for the transfer. The second gesture input can made in the area of the first interface device 712a, such as by the user 414 moving their hand toward the first interface device 712a.

Figure 9:
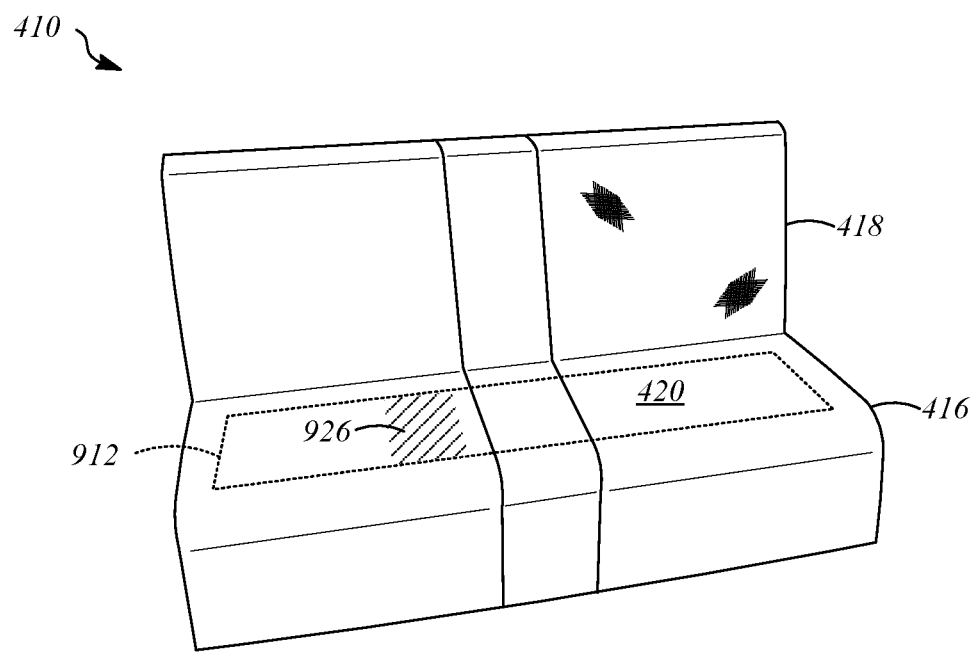
FIG. 9 is an illustration that shows the seating assembly according to an implementation in which the seating assembly includes an interface device that includes multiple areas that can be activated and deactivated.

FIG. 9 is an illustration that shows the seating assembly 410 according to an implementation in which the seating assembly includes an interface device 912 that includes multiple areas that can be activated and deactivated. Selection of an area of the interface device 912 for activation can be performed using, for example, the sensors and inputs described with respect to the system 305, such as the vision sensor 307a.

In the illustrated example, the interface device 912 extends along the seating surface 420 a majority of a distance between a first end of the seat base 416 to a second end of the seat base 416. A portion of the interface device 912 is activated, to define an active area 926 of the interface device 912. The active area 926 of the interface device 912 can be utilized in the manner described with respect to the active state of the interface device 412, including display of the visible location indication 522 and display of the user interface 624. The interface device 912 can be controlled to define the active area 926 in different locations. For example, the active area 926 can be moved as described with respect to selecting among multiple interface devices and transferring the user interface 624 between interface devices as described in FIGS. 7-8 with respect to the first interface device 712a, the second interface device 712b, and the third interface device 712c.

Figure 10:
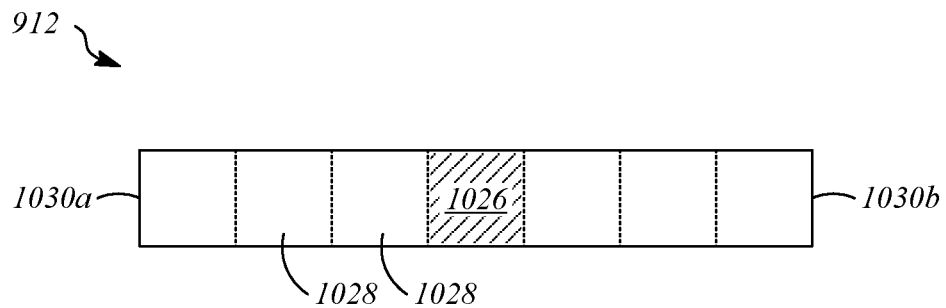
FIG. 10 shows an example of display areas defined using the interface device.

FIG. 10 shows an example of display areas 1028 defined using the interface device 912. In this example, the interface device 912 is divided into display areas 1028 that are arranged side-by-side in a lengthwise direction of the interface device 912 from a first end 1030a of the interface device 912 to a second end 1030b of the interface device 912. The display areas 1028 are non-overlapping. In this example, there are seven of the display areas 1028, but other numbers of the display areas 1028 can be defined using the interface device 912. The display areas 1028 can be independently activated and deactivated. At a given time, zero, one, some, or all of the display areas 1028 can be active. In the illustrated example, two of the display areas 1028 are in the active state and define active areas 1026 of the interface device 912. Any of display areas 1028 can be selected for use as the active area 1026 to display the user interface 624, such as by sensing a location of the user 414, a command from the user 414, or by transfer between the display areas 1028 as previously described.

Figure 11:
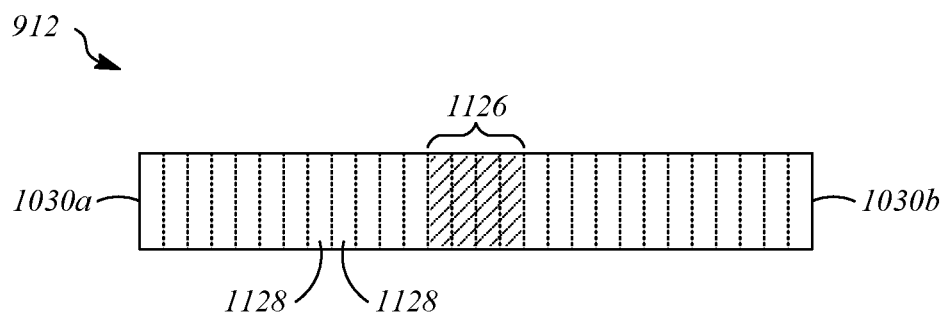
FIG. 11 shows an example of display portions defined using the interface device.

FIG. 11 shows an example of display portions 1128 defined using the interface device 912. In this example, the interface device 912 is divided in the length dimension, with the display portions 1128 being short segments of the interface device 912 that are arranged side-by-side in the length dimension between the first end 1030a and a second end 1030b of the interface device 912. As an example, a length dimension of the display portions 1128 can be 10 percent or less of a width dimension of the interface device 912. In one implementation, the length dimension of each of the display portions 1128 corresponds to one of more display elements. Display elements are individually addressable areas of the interface device 912, such as light emitting devices (e.g., single color or RGB light-emitting diodes), or pixels of a display screen (e.g., LCD, LED, or OLED).

An active area 1126 of the interface device 912 is defined by activating a contiguous grouping of the display portions 1128. Since the active area 1126 is defined by the display portions 1128, the active area 1126 is not limited to discrete positions relative to the interface device 912, but instead, can be formed by any grouping of the display portions 1128. For example, the user could choose between a first grouping of the display portions 1128 and a second grouping of the display portions 1128 for defining the active area 1126, and the first and second groupings of the display portions 1128 may be overlapping. The active area 1126 may be selected as previously described, such as by sensing a location of the user 414, a command from the user 414, or by transfer between overlapping or non-overlapping groupings of the display portions 1128 as previously described.

Figure 12:
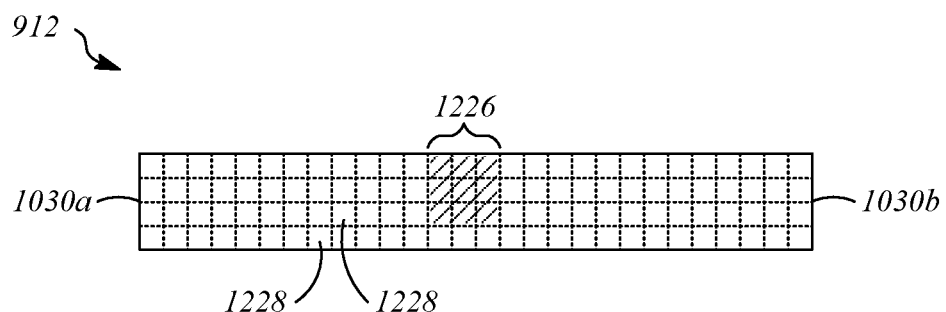
FIG. 12 shows an example of display portions defined using the interface device.

FIG. 12 shows an example of display portions 1228 defined using the interface device 912. In this example, the interface device 912 is divided in the length and width dimensions, with the display portions 1228 being square or rectangular segments of the interface device 912 that are arranged in a rectangular array relative to the length dimension and the width dimension of the interface device 912. In one implementation, the length dimension and the width dimension of each of the display portions 1228 corresponds to one of more display elements, as previously described.

An active area 1226 of the interface device 912 is defined by activating a contiguous grouping of the display portions 1228. The active area 1226 can extend across part or all of the width dimension of the interface device 912 and can extend across part or all of the length dimension of the interface device 912. Since the active area 1226 is defined by the display portions 1228, the active area 1226 is not limited to discrete positions relative to the interface device 912, which allows the active area 1226 to function in the manner described with respect to the active area 1126 of FIG. 11.

Figure 13:
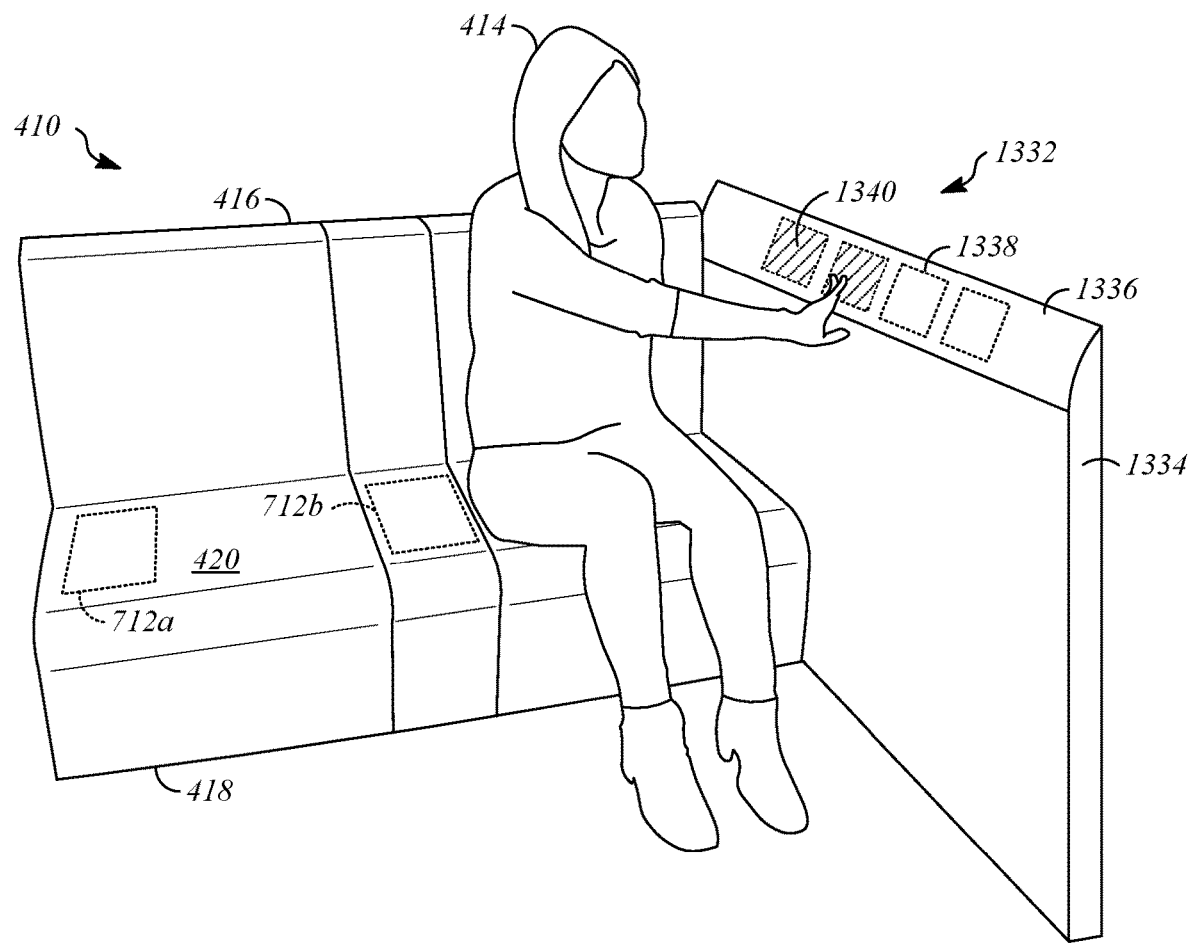
FIG. 13 is an illustration that shows the seating assembly and a panel assembly.

FIG. 13 is an illustration that shows the seating assembly 410 and a panel assembly 1332. In the illustrated example, the seating assembly 410 is as described with respect to FIG. 5, including the seat base 416, the seat back 418, the seating surface 420, the first interface device 712a, the second interface device 712b, and the third interface device 712c that are each configured as previously described. The user 414 is positioned on the seating assembly 410 near the panel assembly 1332. The panel assembly 1332 includes a panel 1334, which may be a wall, a divider, a door, or a similar structure. In one implementation, the panel 1334 may be a portion of an automobile interior. A panel surface 1336 is located on the panel 1334 and is similar to the seating surface 420 in material and function. As examples, the panel surface 1336 may be made from textile materials, faux leather materials, or thin wood veneer.

One or more interface devices 1338 are concealed behind the panel surface 1336 in their respective inactive states, and are visible in their respective active states, as previously described with respect to the interface devices 412. When one of the interface devices 1338 is activated, an active area 1340 is defined in the respective one of the interface devices 1338, and the user 414 may view and interact with content that is displayed by the interface devices 1338, as previously described with respect to the interface device 412.

As an alternative to the interface devices 1338, the panel assembly 1332 can incorporate a single interface device that is able to define multiple different active areas, as explained with respect to the interface device 912 and FIGS. 9-12.

Figure 14:
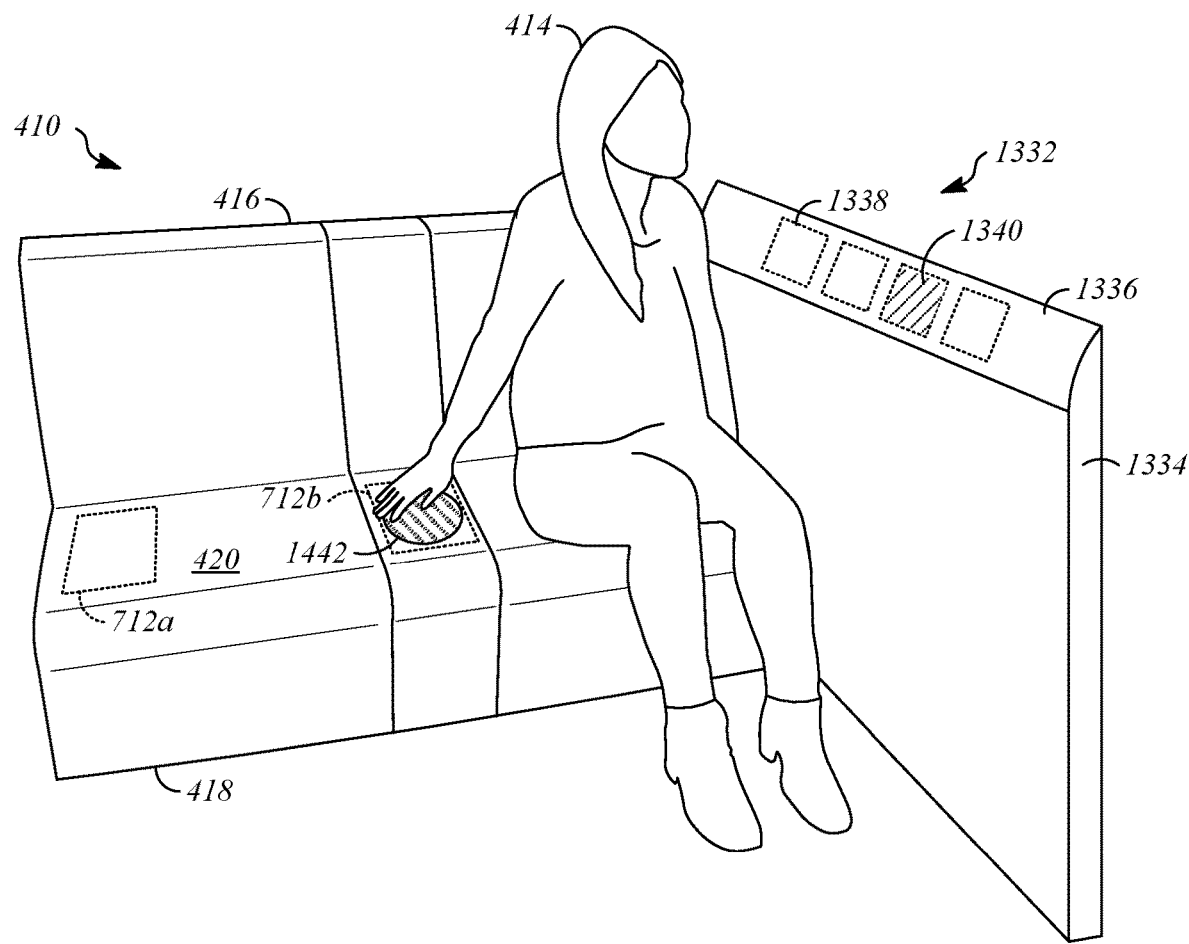
FIG. 14 is an illustration that shows the seating assembly and the panel assembly including simultaneous use of multiple interface devices.

FIG. 14 is an illustration that shows the seating assembly 410 and the panel assembly 1332, including simultaneous use of multiple interface devices. In the illustrated example, one of the interface devices 1338 of the panel assembly 1332 is in the active state and defines the active area 1340. The active area 1340 can define content that is viewed by the user 414. The user 414 controls and/or interacts with the content displayed in the active area 1340 of the interface device 1338 using one of the interface devices that is incorporated in the seating assembly 410, such as the second interface device 712b of the seating assembly 410.

In an example of simultaneous use of multiple interface devices, the second interface device 712b can be used to receive gesture inputs that control an interface or other content that is displayed in the active area 1340 of the respective one of the interface devices 1338. In some implementations, the second interface device 712b does not display any visible interface or emit light when being used solely as an input device. In some implementations, the second interface device 712b can display a user interface including an input area indicator 1442 that shows the user where gesture inputs can be received. As an example, the input area indicator 1442 can be a faint bounding box or a glowing area that is defined by light emitted from the second interface device 712b.

Figure 15:
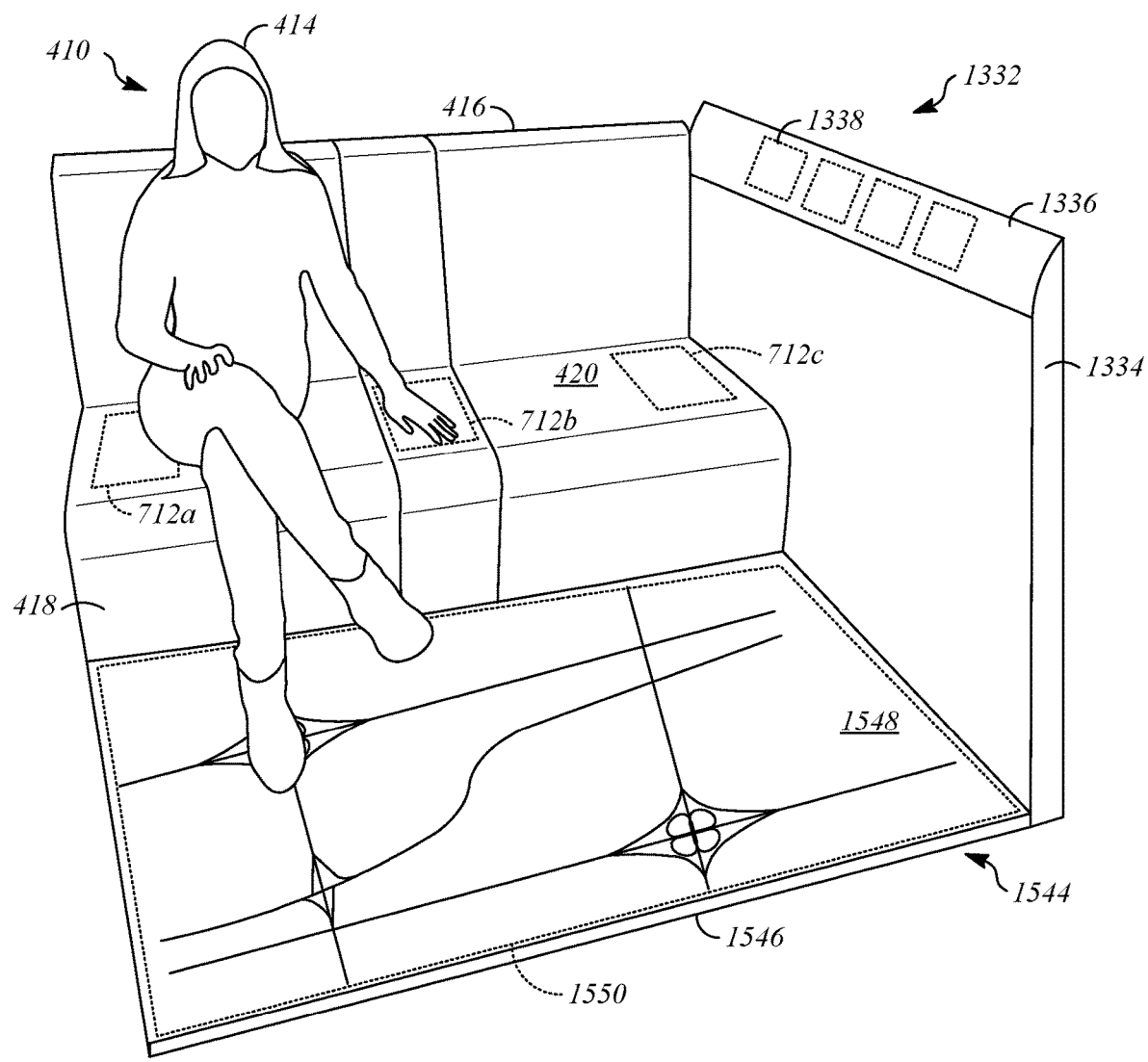
FIG. 15 is an illustration that shows the seating assembly, the panel assembly, and a floor assembly.

FIG. 15 is an illustration that shows the seating assembly 410, the panel assembly 1332, and a floor assembly 1544. The seating assembly 410 and the panel assembly 1332 are as previously described. The floor assembly 1544 includes a floor structure 1546. A floor surface 1548 is located on the floor structure 1546 and is similar to the seating surface 420 in material and function. As examples, the floor surface 1548 may be made from textile materials, plastic materials, or carpeting materials. An interface device 1550 is concealed under the floor surface 1548 and is not visible in an inactive state, but emits light to display content to the user 414 when in an active state. In the illustrated example, the interface device 1550 is displaying content to the user, which in this example is a map that is shown on the floor surface 1548 by the light emitted from the interface device 1550. In the manner explained with respect to FIG. 14, the user can interact with the content user one of the interface devices of the seating assembly 410 or the panel assembly 1332, such as the second interface device 712b of the seating assembly 410. As an alternative a projection-based device may be used to display content on the floor surface 1548 instead of using the interface device 1550 to display the content through the floor surface 1548.

Figure 16:
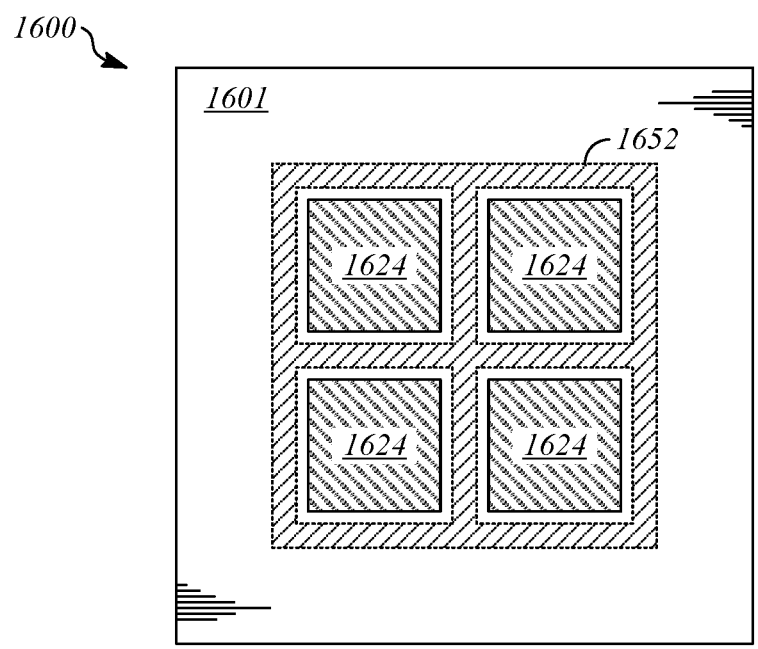
FIG. 16 is a front view illustration that shows a concealed user interface assembly that incorporates passive haptic feedback.

FIG. 16 is a front view illustration that shows a concealed user interface assembly 1600 that incorporates passive haptic feedback. The concealed user interface assembly 1600 includes a surface 1601, which is similar to the surface 101 of FIG. 1. User interface portions 1624 can be displayed by emission of light through the surface 1601 as previously described. In the illustrated example, four of the user interface portions 1624 are present. To allow a user to locate the user interface portions 1624 and/or to perceive boundaries between the user interface portions 1624, the concealed user interface assembly 1600 includes passive haptic areas 1652. The passive haptic areas 1652 have a geometric configuration that corresponds to a geometric configuration of the user interface portions 1624. In the illustrated example, the passive haptic areas 1652 surround and extend between the user interface portions 1624 to indicate their presence and extents.

The passive haptic areas 1652 are distinguishable from surrounding areas of the surface 1601 by sense of touch. As examples, the passive haptic areas can be embossed, raised, textured, or otherwise configured to impart a tactile sensation to the user that touches the surface 1601. This sensation is intended to indicate, to the user, some information regarding the configuration of the user interface portions 1624. Thus, for example, the passive haptic areas 1652 serve as tactile feedback areas in which tactile feedback is provided that corresponds to a user interface, such as the user interface portions 1624, and the tactile feedback areas can indicate features of the user interface, such as a boundary between a first area of the user interface and a second area of the user interface. This allows the user to sense, by touching, the extents of and boundaries between the user interface portions 1624. Although a grid-like configuration is shown for the passive haptic areas 1652, other configurations can be used, such as arc segments, circles, concentric circles, and irregular shapes.

Figure 17:
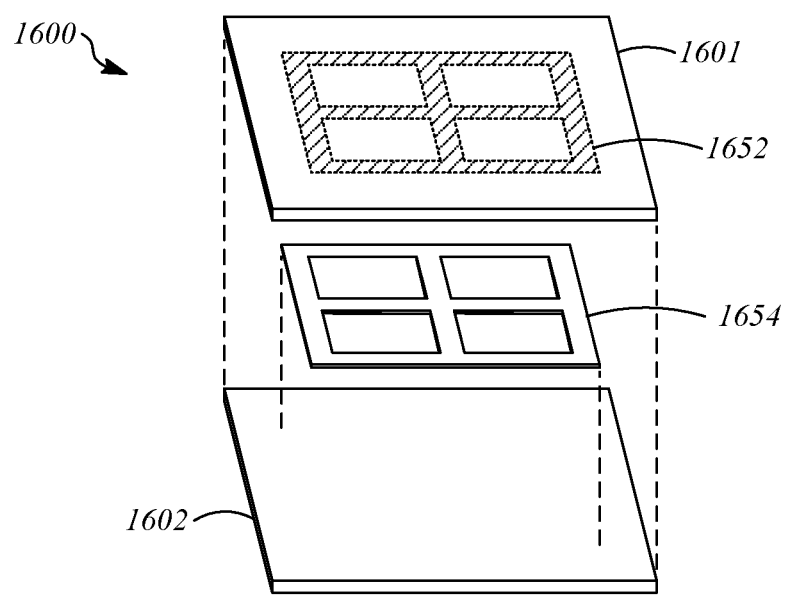
FIG. 17 is an exploded view of the concealed user interface assembly of FIG. 16 showing an example of a structural configuration that can be used to define passive haptic areas.

FIG. 17 is an exploded view of the concealed user interface assembly 1600 showing an example of a structural configuration that can be used to define the passive haptic areas 1652. A raised structure 1654 is positioned between the surface 1601 and an interface device 1602. The interface device 1602 is similar to the interface device 202 of FIG. 2, as previously described. The raised structure 1654 has a shape that corresponds to the shape of the passive haptic areas 1652, so that the user can perceive the edges of the raised structure 1654 through the surface 1601 by sense of touch. The raised structure 1654 can be opaque if none of the user interface portions 1624 are to be displayed within the passive haptic areas 1652, or can be translucent or transparent to allow display of the user interface portions 1624 within the passive haptic areas 1652.

Figure 18:
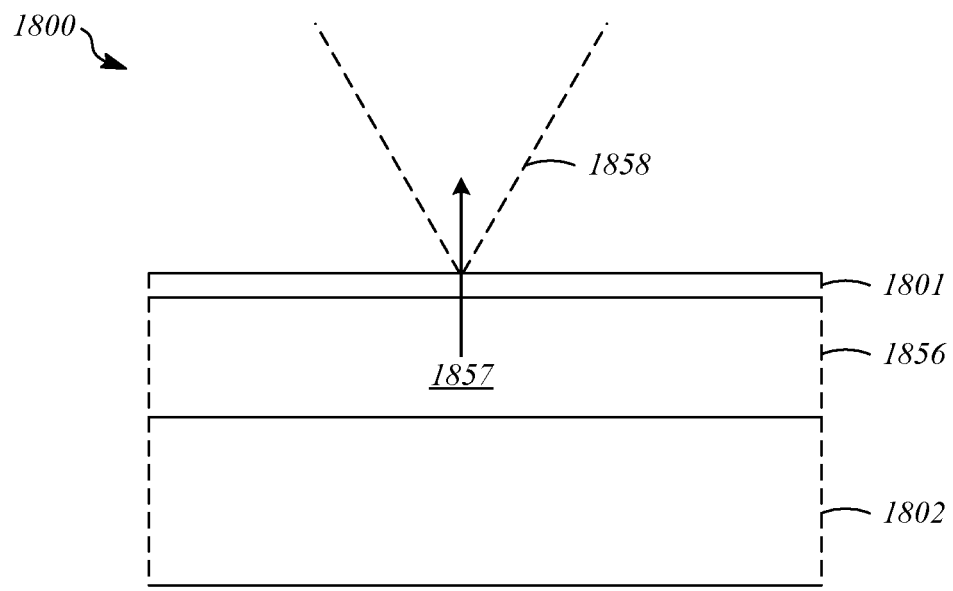
FIG. 18 is a cross-section illustration showing a concealed user interface assembly having a limited view angle.

FIG. 18 is a cross-section illustration showing a concealed user interface assembly 1800 having a limited view angle, which can limit visibility of the concealed user interface assembly 1900 by persons other than its user. The concealed user interface assembly 1800 includes a surface 1801 and an interface device 1802, which are similar to the surface 101 and the interface device 202 of FIG. 2, as previously described. An intermediate layer 1856 is positioned between the surface 1801 and the interface device 1802. The intermediate layer 1856 can be formed from a privacy filter material that limits the angles of light transmitted through the material by incorporating a large number of separate light conducting channels. Light 1857 that is emitted by the interface device 1802 passes through the intermediate layer 1856 and defines a limited field of vision 1858. For example, the limited field of vision 1858 may correspond to full visibility of the light 1857 within an angular range (e.g. 30 degrees) from a direction that is perpendicular to the surface 1801 and/or the interface device 1802, and reduced visibility beyond the angular range.

Figure 19:
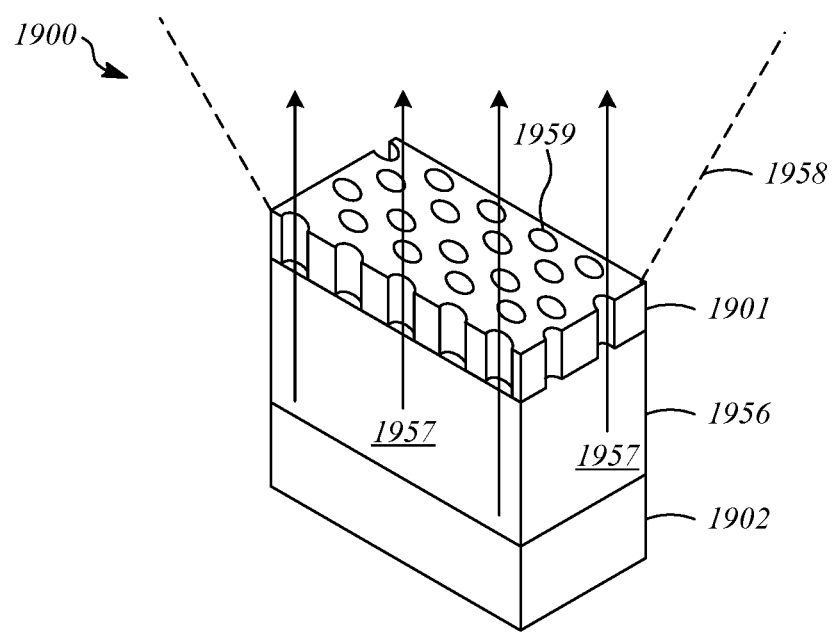
FIG. 19 is a cross-section perspective illustration showing another example of a concealed user interface assembly having a limited view angle.

FIG. 19 is a cross-section perspective illustration showing a concealed user interface assembly 1900 having a limited view angle, which can limit visibility of the concealed user interface assembly 1900 by persons other than its user. The concealed user interface assembly 1800 includes a surface 1901 and an interface device 1902, which are similar to the surface 101 and the interface device 202 of FIG. 2, as previously described. An intermediate layer 1956 formed from an optically transmissive material may be positioned between the surface 1901 and the interface device 1902 to slightly space the surface 1901 from the interface device 1902. The surface 1901 is formed from an opaque material that has closely-spaced pores 1959 that extend through it. As one example, some PVC faux leather materials have a suitable pore structure. As another example, a suitable pore structure could be formed through a material by means such as punching, drilling, or laser-drilling. The closely-spaced pores allow passage of light over a limited range of angles of incidence relative to the surface 1901, which limits the angular orientation for light 1957 that passes through the surface 1901 after it is emitted by the interface device 1902. This define a limited field of vision 1958. For example, the limited field of vision 1958 may correspond to full visibility of the light 1957 within an angular range (e.g. 30 degrees) from a direction that is perpendicular to the surface 1901 and/or the interface device 1902, and reduced visibility beyond the angular range.

Figure 20:
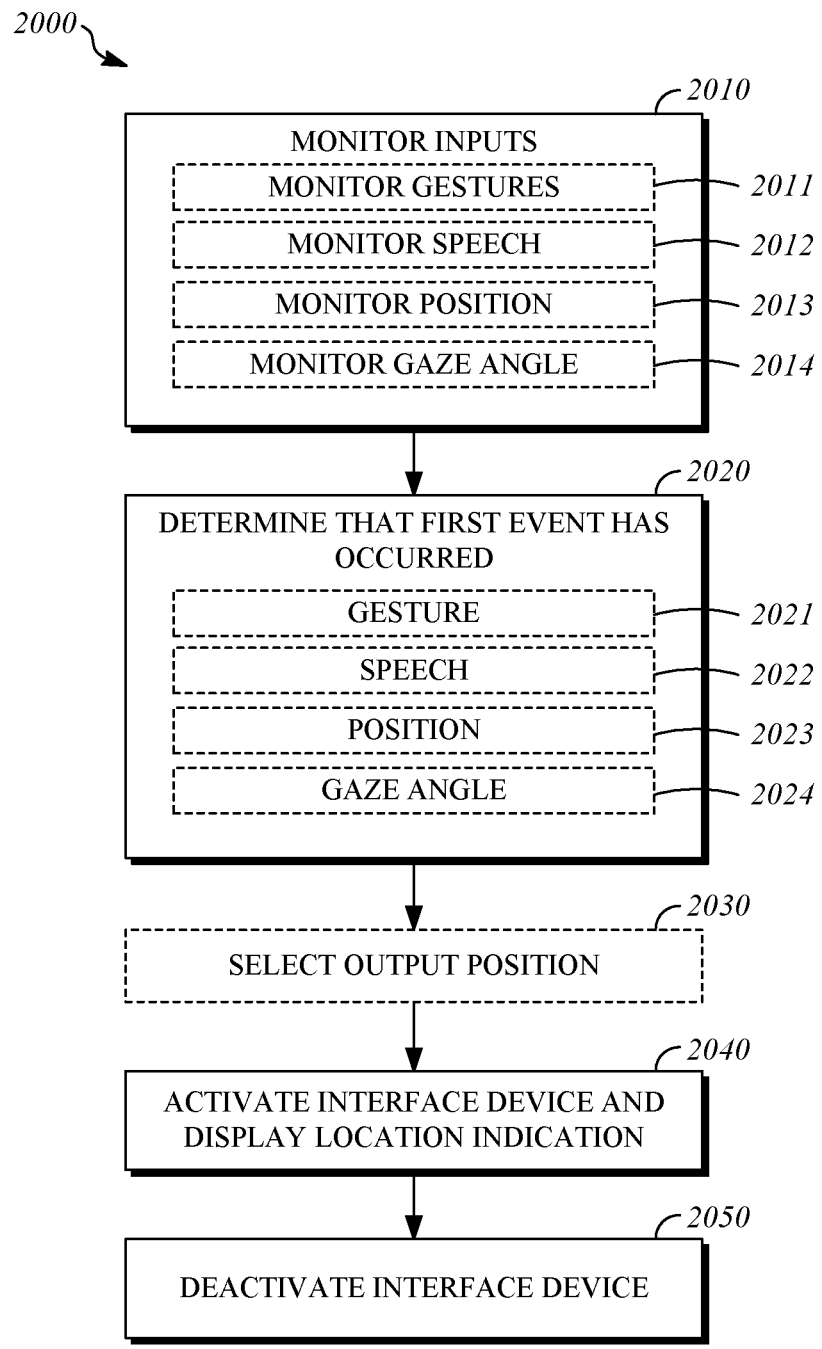
FIG. 20 is a flowchart that shows a process for activating a concealed interface device according to a first example.

FIG. 20 is a flowchart that shows a process for activating a concealed interface device based on according to a first example. The term "user interest" indicates that there is a likelihood that the user may wish to use the interface device. The process 2000 can be performed, for example, using the previously-described concealed user interface assemblies and interface devices. The process 2000 is performed using a user interface device that is concealed behind a surface when in a deactivated state, and is visible in an activated state by emitting light through the surface. The process 2000 will be described with reference to the interface device 202 and the surface 101 of the concealed user interface assembly 100, but can be implemented using other devices.

Initially, the interface device 202 is in the deactivated state, as a result of a previously-performed operation of placing the interface device 102 in the deactivated state, such that the interface device 102 is concealed by the surface 101. If multiple interface devices are present, at least one of them is in the deactivated state.

Operation 2010 includes monitoring inputs from input devices. Examples of input devices that can be monitored in operation 2010 include the input sensor 203a of the interface device 202, the vision sensor 307a, and the audio sensor 307b.

Optional operation 2011 includes monitoring gesture inputs. As an example, motion of the hands of the user 309 can be sensed using the input sensor 203a of the interface device 202. Monitoring gesture inputs in optional operation 2011 can include monitoring gesture inputs that contact the surface 101, and monitoring gesture inputs that do not contact the surface 101 (e.g. hand movements above or adjacent to the surface. Optional operation 2012 includes monitoring speech inputs. As an example, speech inputs can be monitored using the audio sensor 307b, by detecting words and phrases spoken by the user 309. For example, the controller 306 can be provided with speech recognition functions to detect words and phrases.

Optional operation 2013 includes monitoring vision inputs that indicate a user position. As an example, vision inputs can be monitored using the vision sensor 307a. Outputs from the vision sensor 307a, such as images or point clouds, can be used as inputs to a machine vision function that is executed by the controller 306 to identify features including the user 309 and portions of the body of the user 309, such as the user's hands. Optional operation 2014 includes monitoring vision inputs that indicate a user gaze angle from the vision sensor 307a, such as images or point clouds, can be used as inputs to a machine vision function that is executed by the controller 306 to identify features including the head and eyes of the user 309 to estimate a gaze angle for the user 309.

Any or all of optional operation 2011, optional operation 2012, optional operation 2013, and optional operation 2014 can be included in operation 2010 of the process 2000. Other input monitoring operations can also be included in operation 2010 of the process 2000.

Operation 2020 includes determining that a first event has occurred. The first event signifies a possibility that the use may want or need to utilize the interface device 202, and includes previously described examples of events. Determining that the first event has occurred is performed using the inputs obtained in operation 2010.

Optional operation 2021 includes determining that the first event has occurred based on a gesture input, such as movement of the hand of the user 309 toward or into light contact with the interface device 202. Optional operation 2022 includes determining that the first event has occurred based on a speech input, such as a non-command verbal statement that comments on temperature, which can be used as a basis for inferring that the user 309 may wish to adjust a climate control setting. Optional operation 2023 includes determining that the first event has occurred based on a position of the user 309 of a part of the body of the user, which can be determined using output from the vision sensor 307a as described with respect to optional operation 2013. For example, when the user 309 first approaches the interface device 202 or changes position with respect to it, it may be helpful to inform the user that the interface device 202 is located nearby. Optional operation 2024 includes determining that the first event has occurred based on the gaze angle determining in optional operation 2014, for example, when the gaze angle of the user 309 is directed toward the location of the interface device 202.

Any or all of optional operation 2021, optional operation 2022, optional operation 2023, and optional operation 2024 can be included in operation 2020 of the process 2000. Other determining operations can also be included in operation 2020 of the process 2000. Thus, multiple types of inputs can be used separately for determining whether the first event has occurred, or can be combined to determine that the first event has occurred based on multiple input signals from different sources.

Subsequent to determining that the first event has occurred in operation 2020, optional operation 2030 can be performed to select an output position. As one example, the output position can be a selection of a particular interface device to use for display of an indication to the user 309 when multiple interface devices are available. As another example, the output position can be a selection of a portion of an interface device to be used as an active area when an interface device near the user is configured to allow for selecting the position of an active area. Optional operation 2030 can be performed based on the position of the user 309, as previously described and as will be described further herein. Optional operation 2030 can be omitted, such as in implementations where only a single interface device is present.

In operation 2040, an interface device is activated (i.e., placed in the activated state by changing the state of the interface device from the deactivated state to the activated state) and a location indication is output to communicate the position of the interface device to a user. For example, the interface device selected in optional operation 2030, such as the interface device 202, can be activated and caused to display the location indication 122 by transmission of a signal from the controller 306. The location indication may be visible, such as illumination emitted by the interface device 202. The location indication may be audible, such as a sound played from the location of the interface device 202. The location indication may be tactile, such as a vibration emitted from the location of the interface device 202.

In operation 2050, the interface device that was activated in operation 2040 can be deactivated (i.e., placed in the deactivated state by changing the state of the interface device from the activated state to the deactivated state). Operation 2050 therefore includes ceasing output of the location indication. As an example, the interface device 202 can be deactivated after a predetermined period of time has passed without interaction by the user 309 with the interface device 202. Alternatively, operation 2050 can be omitted, such as in response to a further input that causes output of the user interface 124.

Figure 21:
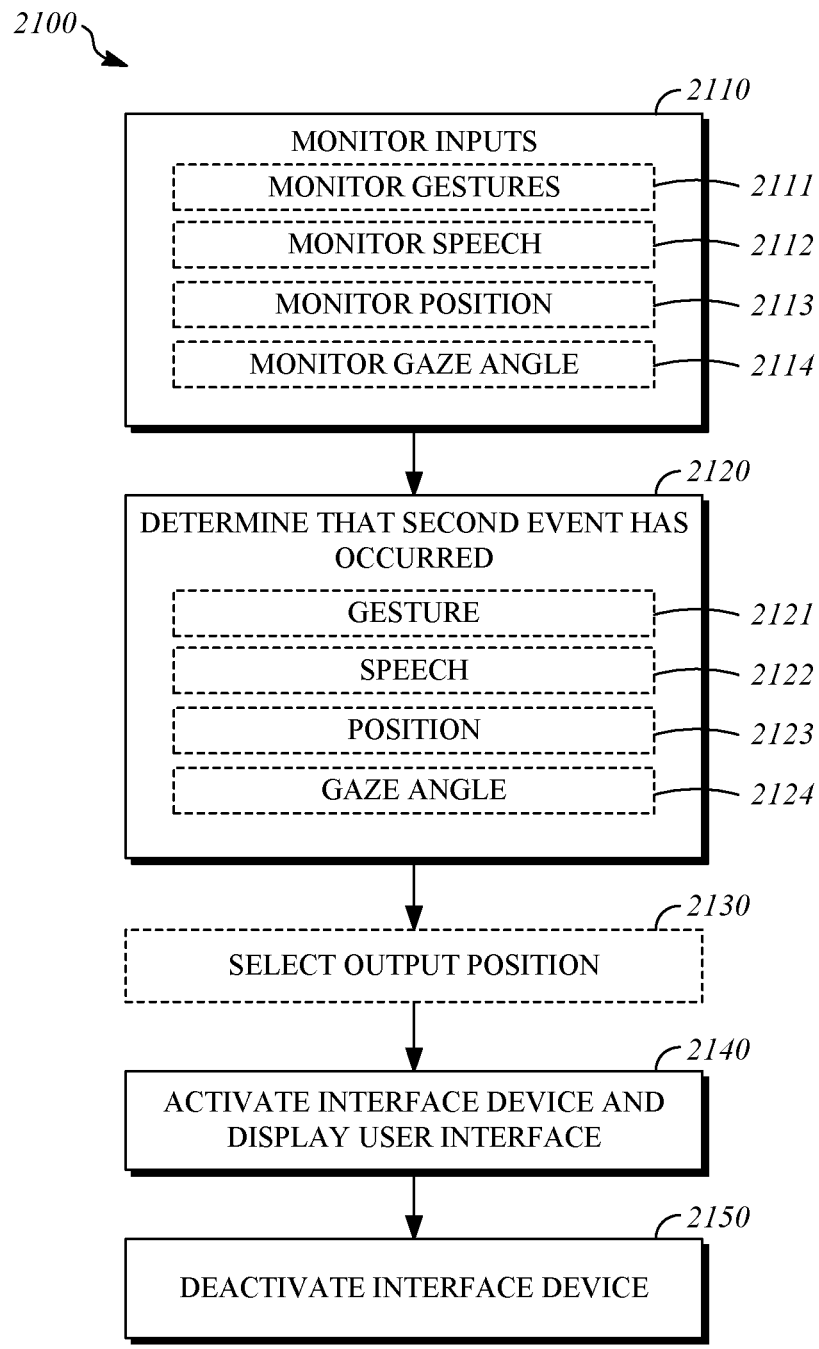
FIG. 21 is a flowchart that shows a process for activating a concealed interface device according to a second example.

FIG. 21 is a flowchart that shows a process for activating a concealed interface device based on user interest according to a second example. The process 2100 can be performed, for example, using the previously-described concealed user interface assemblies and interface devices. The process 2100 is performed using a user interface device that is concealed behind a surface when in a deactivated state, and is visible in an activated state by emitting light through the surface. The process 2100 will be described with reference to the interface device 202 and the surface 101 of the concealed user interface assembly 100, but can be implemented using other devices.

Initially, the interface device 202 is in the deactivated state as a result of a previously-performed operation of placing the interface device 102 in the deactivated state, such that it is concealed by the surface 101. Alternatively, the interface device 202 may be in the activated state and outputting a location indication, such as the location indication 122. If multiple interface devices are present, at least one of them is in the deactivated state or outputting a location indication.

Operation 2110 includes monitoring inputs from input devices as described with respect to operation 2010 of the process 2000. Optional operation 2111 includes monitoring speech inputs as described with respect to optional operation 2011. Optional operation 2112 includes monitoring gesture inputs as described with respect to optional operation 2012. Optional operation 2113 includes monitoring vision inputs that indicate a user position as described with respect to optional operation 2013. Optional operation 2114 includes monitoring vision inputs that indicate a user gaze angle as described with respect to optional operation 2014.

Any or all of optional operation 2111, optional operation 2112, optional operation 2113, and optional operation 2114 can be included in operation 2110 of the process 2100. Other input monitoring operations can also be included in operation 2110 of the process 2100.

Operation 2120 includes determining that a second event has occurred. The second event signifies a possibility that the use may want or need to utilize the interface device 202, and includes previously described examples of events. Determining that the second event has occurred is performed using the inputs obtained in operation 2110.

Optional operation 2121 includes determining that the second event has occurred based on a gesture input, such as movement of the hand of the user 309 into contact with the interface device 202. As an example, contact of the user's hand with the interface device 202 may be interpreted as occurrence of the second event when a pressure level of the contact is above a threshold or based on the orientation of the user's hand or based on the portion of the user's hand that contacts the interface device 202. Optional operation 2122 includes determining that the second event has occurred based on a speech input, such as a verbal command that requests a change to a setting or requests display of a user interface, requests display of a particular user interface (e.g., music control, lighting control, or climate control), or requests display of a user interface that includes particular content (e.g., a map, a television show, or a movie).

Optional operation 2123 includes determining that the second event has occurred based on a position of the user 309 of a part of the body of the user, which can be determined using output from the vision sensor 307a. For example, when the user 309 first approaches the interface device 202 or changes position with respect to it, this can be interpreted as occurrence of the second event. Optional operation 2124 includes determining that the second event has occurred based on the gaze angle determining in optional operation 2114, for example, when the gaze angle of the user 309 is directed toward the location of the interface device 202 and remains there for more than a threshold time period.

Any or all of optional operation 2121, optional operation 2122, optional operation 2123, and optional operation 2124 can be included in operation 2120 of the process 2100. Other determining operations can also be included in operation 2120 of the process 2100. Thus, multiple types of inputs can be used separately for determining whether the second event has occurred, or can be combined to determine that the second event has occurred based on multiple input signals from different sources.

Subsequent to determining that the second event has occurred in operation 2120, optional operation 2130 can be performed to select an output position as described with respect to optional operation 2030 of the process 2000

In operation 2140, an interface device is activated (i.e., placed in the activated state by changing the state of the interface device from the deactivated state to the activated state) and a user interface is output for display to a user. For example, the interface device selected in optional operation 2130, such as the interface device 202, can be activated and caused to display the user interface 124 by transmission of a signal from the controller 306. In situations where the interface device 202 is in the active state with the location indication currently displayed, display of the location indication is removed from the interface device 202 and the user interface 124 is output for display by the interface device 202.

In operation 2150, the interface device that was activated and/or used to display the user interface in operation 2140 can be deactivated (i.e., placed in the deactivated state by changing the state of the interface device from the activated state to the deactivated state). Operation 2150 therefore includes ceasing output of the user interface. As an example, the interface device 202 can be deactivated after a predetermined period of time has passed without interaction by the user 309 with the interface device 202.

Figure 22:
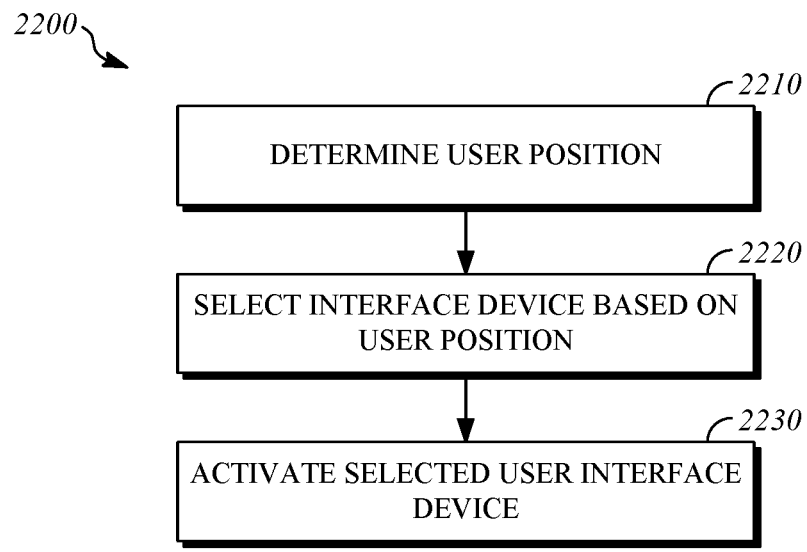
FIG. 22 is a flowchart that shows a process for determining a user interface location according to a first example.

FIG. 22 is a flowchart that shows a process 2200 for determining a user interface location according to a first example. The process 2200 can be performed, for example, using the previously-described concealed user interface assemblies and interface devices. The process 2200 is performed using a user interface device that is concealed behind a surface when in a deactivated state, and is visible in an activated state by emitting light through the surface. The process 2200 will be described with reference to the first interface device 712a, the second interface device 712b, and the third interface device 712c of the seating assembly 410, but can be implemented using other devices.

In operation 2210, a position of the user is determined, for example, using the vision sensor 307a in the previously-described manner. In operation 2220, an interface device is selected based on the position of the user. The selection made in operation 2220 is between multiple separate interface devices, such as the first interface device 712a, the second interface device 712b, and the third interface device 712c of the seating assembly 410. As an example, the position of the user 414 with respect to each of the first interface device 712a, the second interface device 712b, and the third interface device 712c can be determined. The closest one of the interface devices can be selected. If one of the interface devices is obstructed and not visible, it can be excluded from selection. For example, an interface device may be obstructed if the user is sitting on it, another person is sitting on it, or an object is placed on it. In operation 2230, the selected user interface device is activated, for example, as described in operation 2050 of the process 2000 or as described in operation 2150 of the process 2100.

The user interface location determining function of the process 2200 can be incorporated in other processes, such as in optional operation 2030 of the process 2000 or in optional operation 2130 of the process 2100.

Figure 23:
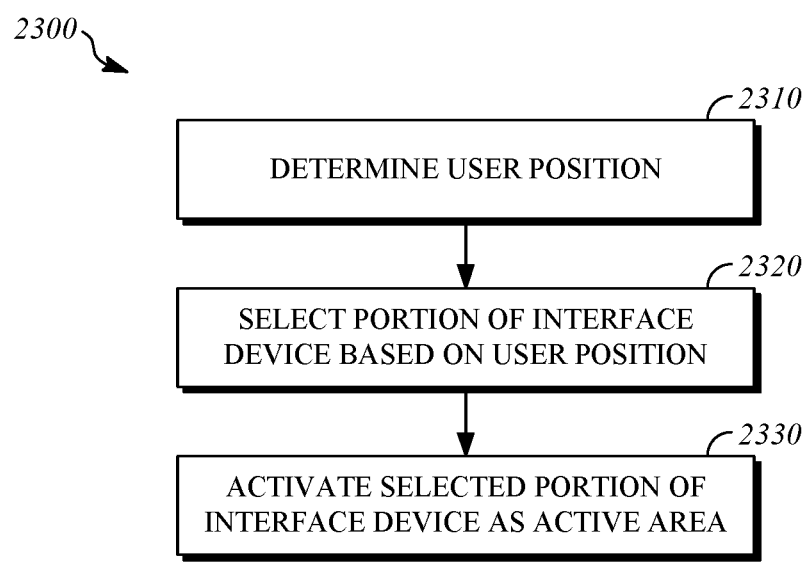
FIG. 23 is a flowchart that shows a process for determining a user interface location according to a second example.

FIG. 23 is a flowchart that shows a process 2300 for determining a user interface location according to a second example. The process 2300 can be performed, for example, using the previously-described concealed user interface assemblies and interface devices. The process 2300 is performed using a user interface device that is concealed behind a surface when in a deactivated state, and is visible in an activated state by emitting light through the surface. The process 2300 will be described with reference to the interface device 912 of the seating assembly 410, but can be implemented using other devices.

In operation 2310, a position of the user is determined, for example, using the vision sensor 307a in the previously-described manner. In operation 2320, s portion of an interface device is selected based on the position of the user. The selection made in operation 2330 is between multiple portions of a single interface device, such as the interface device 912. The multiple portions can be non-overlapping, such as the display areas 1028 of FIG. 10, or the multiple portions can be overlapping, such as groups of the display portions 1128 of FIG. 11 or groups of the display portions 1228 of FIG. 12. As an example, the position of the user 414 with respect to the interface device 912 can be determined. A display area or a group of display portions can be chosen based on, for example, nearness to the user 414. Display areas or groups of display portions that are obstructed by or within a threshold distance from an obstructed area can be excluded from selection. In operation 2330, the selected display area or group of display portions of the user interface device is activated, for example, as described in operation 2050 of the process 2000 or as described in operation 2150 of the process 2100.

The user interface location determining function of the process 2300 can be incorporated in other processes, such as in optional operation 2030 of the process 2000 or in optional operation 2130 of the process 2100.

Figure 24:
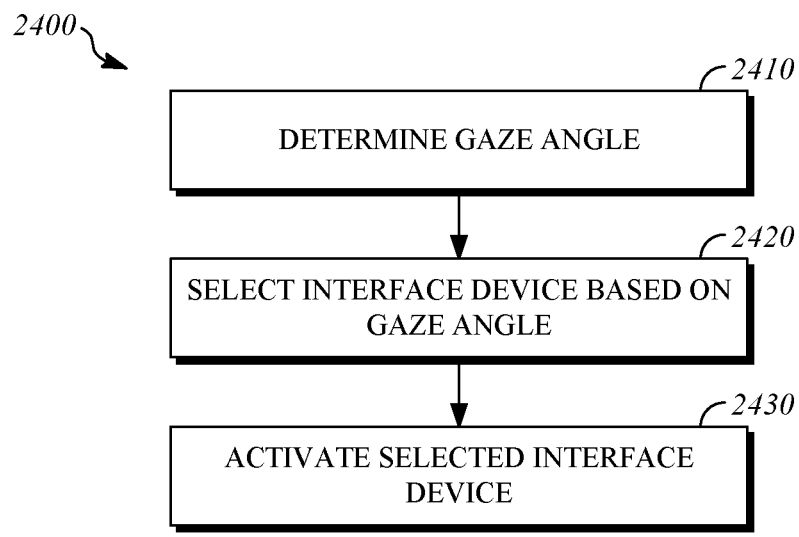
FIG. 24 is a flowchart that shows a process for determining a user interface location according to a third example.

FIG. 24 is a flowchart that shows a process 2400 for determining a user interface location according to a third example. The process 2400 can be performed, for example, using the previously-described concealed user interface assemblies and interface devices. The process 2400 is performed using a user interface device that is concealed behind a surface when in a deactivated state, and is visible in an activated state by emitting light through the surface. The process 2400 will be described with reference to the first interface device 712a, the second interface device 712b, and the third interface device 712c of the seating assembly 410, but can be implemented using other devices.

In operation 2410, a gaze angle of the user is determined, for example, using the vision sensor 307a to output an image and estimating the gaze angle based on the image in the previously-described manner. In operation 2420, an interface device is selected based on the position of the user. The selection made in operation 2420 is between multiple separate interface devices, such as the first interface device 712a, the second interface device 712b, and the third interface device 712c of the seating assembly 410. As an example, locations that correspond to the gaze angle of the user 414 can be compared to each of the first interface device 712a, the second interface device 712b, and the third interface device 712c. The closest one of the interface devices relative to a path of the user's gaze can be selected. In operation 2430, the selected user interface device is activated, for example, as described in operation 2050 of the process 2000 or as described in operation 2150 of the process 2100.

The user interface location determining function of the process 2400 can be incorporated in other processes, such as in optional operation 2030 of the process 2000 or in optional operation 2130 of the process 2100.

Figure 25:
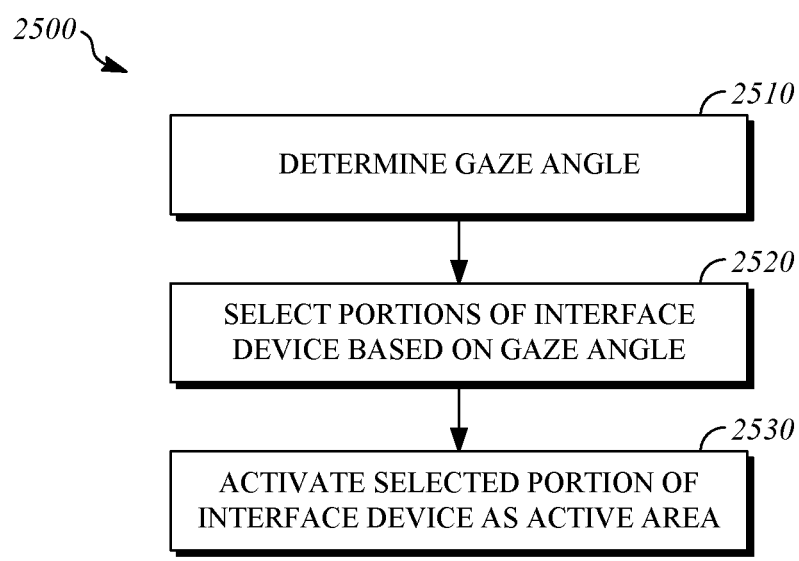
FIG. 25 is a flowchart that shows a process for determining a user interface location according to a fourth example.

FIG. 25 is a flowchart that shows a process 2500 for determining a user interface location according to a fourth example. The process 2500 can be performed, for example, using the previously-described concealed user interface assemblies and interface devices. The process 2500 is performed using a user interface device that is concealed behind a surface when in a deactivated state, and is visible in an activated state by emitting light through the surface. The process 2500 will be described with reference to the interface device 912 of the seating assembly 410, but can be implemented using other devices.

In operation 2510, a gaze angle of the user is determined, for example, using the vision sensor 307a to output an image and estimating the gaze angle based on the image in the previously-described manner. In operation 2520, an interface device is selected based on the position of the user. The selection made in operation 2330 is between multiple portions of a single interface device, such as the interface device 912. The multiple portions can be non-overlapping, such as the display areas 1028 of FIG. 10, or the multiple portions can be overlapping, such as groups of the display portions 1128 of FIG. 11 or groups of the display portions 1228 of FIG. 12. As an example, locations that correspond to the gaze angle of the user 414 can be compared to display areas or groups of display portions from the interface device 912. The closest display area or group of display portions relative to a path of the user's gaze can be selected. Display areas or groups of display portions that are obstructed by or within a threshold distance from an obstructed area can be excluded from selection. In operation 2530, the selected display area or group of display portions of the user interface device is activated, for example, as described in operation 2050 of the process 2000 or as described in operation 2150 of the process 2100.

The user interface location determining function of the process 2500 can be incorporated in other processes, such as in optional operation 2030 of the process 2000 or in optional operation 2130 of the process 2100.

Figure 26:
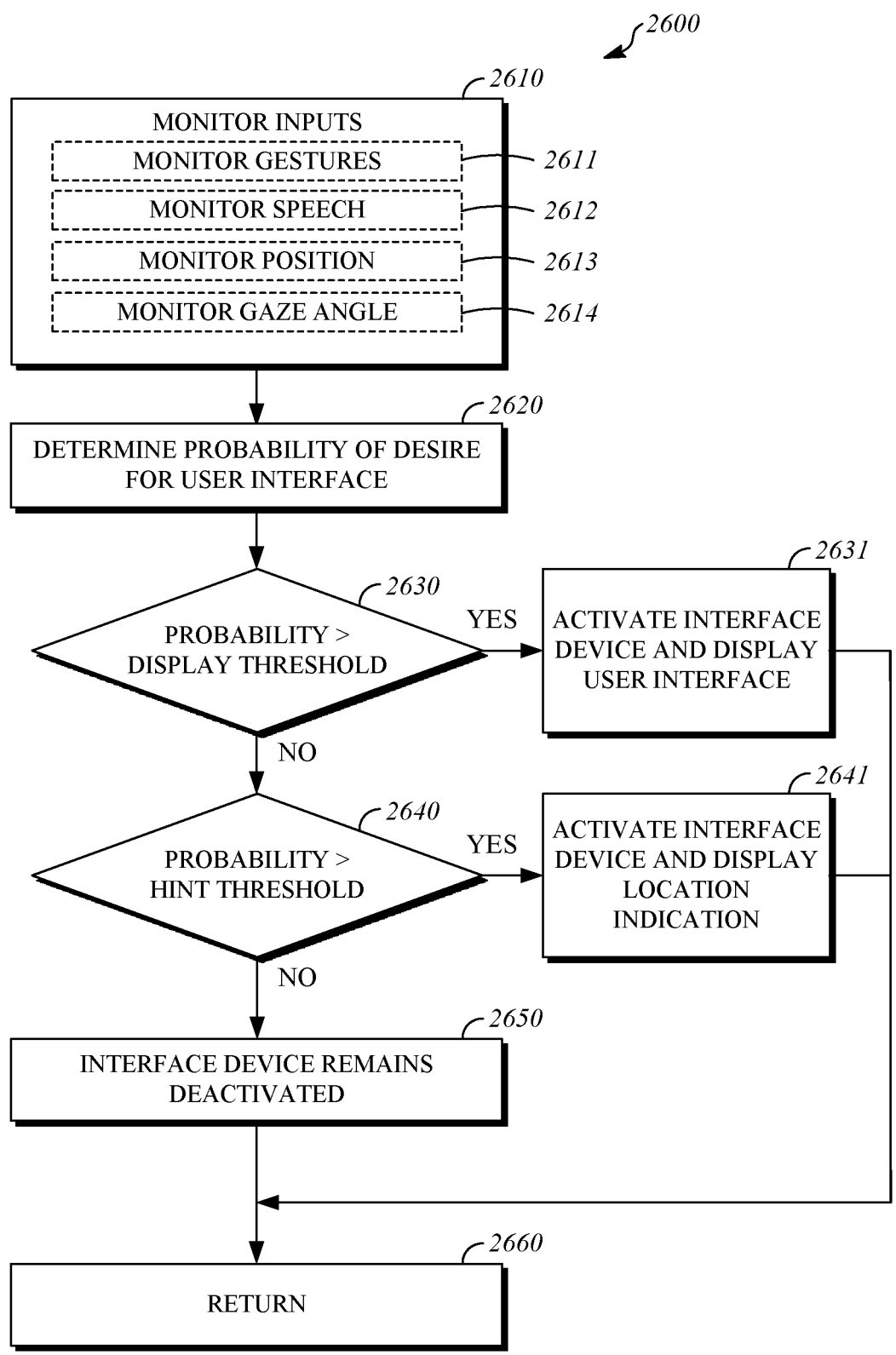
FIG. 26 is a flowchart that shows a process for activating a concealed interface device according to a third example.

FIG. 26 is a flowchart that shows a process 2600 for activating a concealed interface device according to a third example. The process 2600 can be performed, for example, using the previously-described concealed user interface assemblies and interface devices. The process 2600 is performed using a user interface device that is concealed behind a surface when in a deactivated state, and is visible in an activated state by emitting light through the surface. The process 2600 will be described with reference to the interface device 202 and the surface 101 of the concealed user interface assembly 100, but can be implemented using other devices.

Initially, the interface device 202 is in the deactivated state as a result of a previously-performed operation of setting the deactivated state for the interface device 102, such that it is concealed by the surface 101. Alternatively, the interface device 202 may be in the activated state and outputting a location indication, such as the location indication 122. If multiple interface devices are present, at least one of them is in the deactivated state or outputting a location indication.

Operation 2610 includes monitoring inputs from input devices as described with respect to operation 2010 of the process 2000. Optional operation 2611 includes monitoring speech inputs as described with respect to optional operation 2011. Optional operation 2612 includes monitoring gesture inputs as described with respect to optional operation 2012. Optional operation 2613 includes monitoring vision inputs that indicate a user position as described with respect to optional operation 2013. Optional operation 2614 includes monitoring vision inputs that indicate a user gaze angle as described with respect to optional operation 2014.

Operation 2620 uses the inputs from operation 2610 to determine a probability that a user desires display of a user interface, such as the user interface 124 of FIG. 1C. The probability can be determined based on one type of input (e.g., a gesture), or multiple types of inputs (e.g., a gesture in combination with a gaze angle. As one example, the inputs can be provided as inputs to a model that classifies each input, such as by assigning a score to it. For example, the closer a user's gaze angle is to the location of an interface device, the higher the score would be. Scores from multiple input sources could be treated as additive contributions to the probability, or could be combined using other methods. As another example, a probability model could be developed using machine learning techniques. A machine learning model could be trained using ground truth information that includes sets of inputs and data indicating whether the user wanted the user interface to be displayed. As an example, when the user interface is displayed in response to a set of inputs, information describing whether the user interacted with the user interface and, if so, the extent of that interaction, could be captured as ground truth information for use in training the machine learning model.

In operation 2630, the probability that was determined in operation 2620 is compared to an interface display threshold value. The interface display threshold value is selected to correspond to a high probability that the user 309 wishes to have the user interface 124 displayed to them. If the probability that was determined in operation 2620 is greater than the interface display threshold value, the process 2600 advances to operation 2631. In operation 2631, the interface device is activated (i.e., placed in the active state) and a user interface is output for display to the user 309. In implementations that include multiple interface devices or interface devices that include multiple display areas or portions, an interface device or a portion of an interface device is chosen as the position for display of the user interface 124, in the previously-described manner. In situations where the interface device 202 is in the active state with the location indication 122 currently displayed, display of the location indication 122 is removed from the interface device 202 and the user interface 124 is output for display by the interface device 202. The process 2600 then advances to operation 2660.

If the probability that was determined in operation 2620 is less than the interface display threshold value, the process 2600 proceeds to operation 2640. In operation 2640, the probability that was determined in operation 2620 is compared to a hint display threshold value. The interface hint probability threshold is selected to correspond to a probability at which it is likely that the user 309 wishes to have the user interface 124 displayed to them. If the probability that was determined in operation 2620 is greater than the hint display threshold value, the process 2600 advances to operation 2641. In operation 2641, the interface device is activated (i.e., placed in the active state) and the location indication is output to the user 309. For example, the location indication 122 can be displayed to the user 309 from the interface device 202. In implementations that include multiple interface devices or interface devices that include multiple display areas or portions, an interface device or a portion of an interface device is chosen as the position for display of the location indication 122, in the previously-described manner. The process 2600 then advances to operation 2660.

If the probability that was determined in operation 2620 is less than the hint display threshold value, the process 2600 proceeds to operation 2650, in which the interface device remains deactivated. The process 2600 then advances to operation 2660.

In operation 2660, the process returns to operation 2610 for continued monitoring and assessment of inputs.

Figure 27:
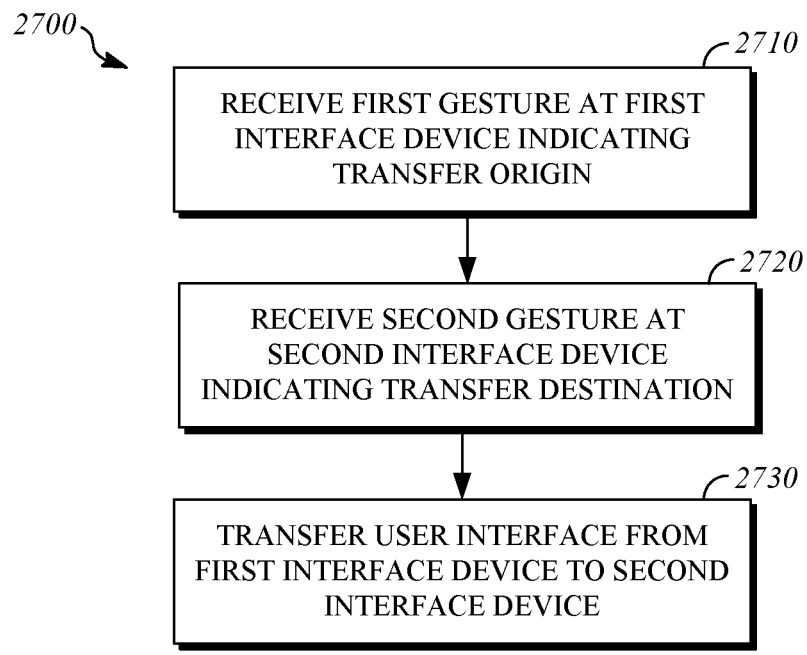
FIG. 27 is a flowchart that shows a process for transferring a user interface between interface devices according to a first example.

FIG. 27 is a flowchart that shows a process 2700 for transferring a user interface between interface devices according to a first example. The process 2700 can be performed, for example, using the previously-described concealed user interface assemblies and interface devices. The process 2700 is performed using a user interface device that is concealed behind a surface when in a deactivated state, and is visible in an activated state by emitting light through the surface. The process 2700 will be described with reference to the interface device 202 and the surface 101 of the concealed user interface assembly 100, but can be implemented using other devices.

Initially, a first interface device, such as the interface device 202, is in the active state. A user interface screen, such as the user interface 124, is displayed to the user 309 by the interface device 202.

In operation 2710 a first gesture is received. The first gesture can be received at a first interface device. The first gesture indicates an intention to transfer the user interface between devices. The first gesture also indicates the first interface as an origin for a transfer of the user interface that is displayed by the first interface device. Any type of gesture can be defined as indicating an intent to initiate a transfer, such as a "pinch and hover" gesture. Thus, the first gesture can be interpreted as a user request for a transfer of the user interface from the first interface device to a different interface device.

In operation 2720, a second gesture is received. The second gesture can be received at a second interface device. The second gesture indicates the second device as an intended transfer destination for the user interface. The second gesture can be performed at the second interface device. As one example, the second gesture can include a tap gesture at the second interface device, where the second gesture is performed subsequent to performance of the first gesture in operation 2710.

In operation 2730 the user interface is transferred from the first interface device to the second interface device. Transferring the user interface can include ceasing display of the user interface at the first interface device, deactivating the first user interface device, activating the second user interface device, and causing display of the user interface at the second interface device.

Figure 28:
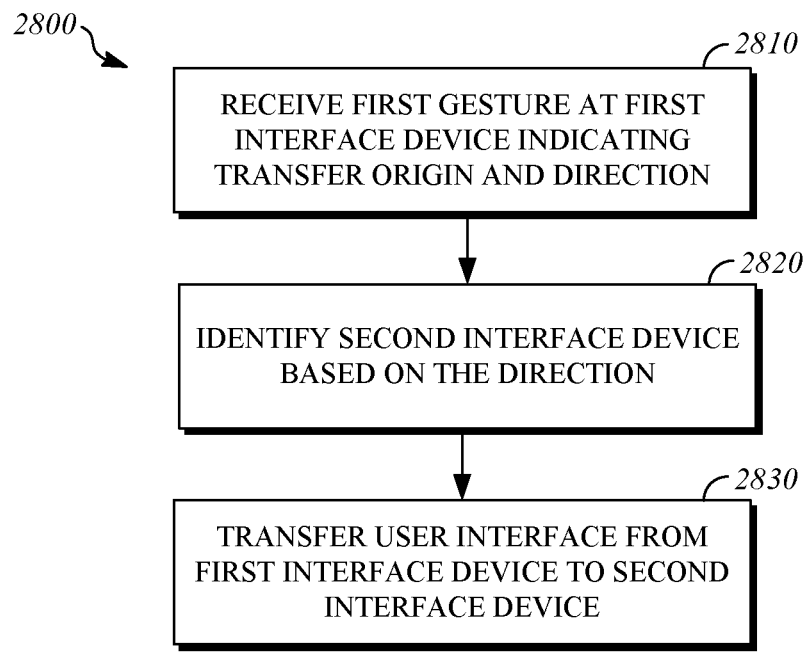
FIG. 28 is a flowchart that shows a process for transferring a user interface between interface devices according to a second example.

FIG. 28 is a flowchart that shows a process 2800 for transferring a user interface between interface devices according to a second example. The process 2800 can be performed, for example, using the previously-described concealed user interface assemblies and interface devices. The process 2800 is performed using a user interface device that is concealed behind a surface when in a deactivated state, and is visible in an activated state by emitting light through the surface. The process 2800 will be described with reference to the interface device 202 and the surface 101 of the concealed user interface assembly 100, but can be implemented using other devices.

Initially, a first interface device, such as the interface device 202, is in the active state. A user interface screen, such as the user interface 124, is displayed to the user 309 by the interface device 202.

In operation 2810 a first gesture is received. The first gesture can be received at a first interface device. The first gesture indicates an intention to transfer the user interface between devices. The first gesture also indicates the first interface as an origin for a transfer of the user interface that is displayed by the first interface device. The first gesture also indicates a transfer direction. The first gesture can be, for example, a swipe gesture. The swipe gesture may be identified as indicating intention to initiate a transfer by having a speed above a threshold value or by extending to (and optionally past) an edge of the first interface device. The line of action of the first gesture can indicate direction.

Accordingly, the first gesture can be interpreted as a user request for a transfer of the user interface from the first interface device to a different interface device, and can also be interpreted as indicating a direction that is associated with the transfer.

In operation 2820, a second interface device is identified as the transfer destination based on the direction of the first gesture. For example, the swipe gesture received in operation 2810 can extend off the edge of the first interface device in a direction that is toward a second interface device to indicate that the second interface device is an intended transfer destination.

In operation 2830 the user interface is transferred from the first interface device to the second interface device. Transferring the user interface can include ceasing display of the user interface at the first interface device, deactivating the first user interface device, activating the second user interface device, and causing display of the user interface at the second interface device.

Figure 29:
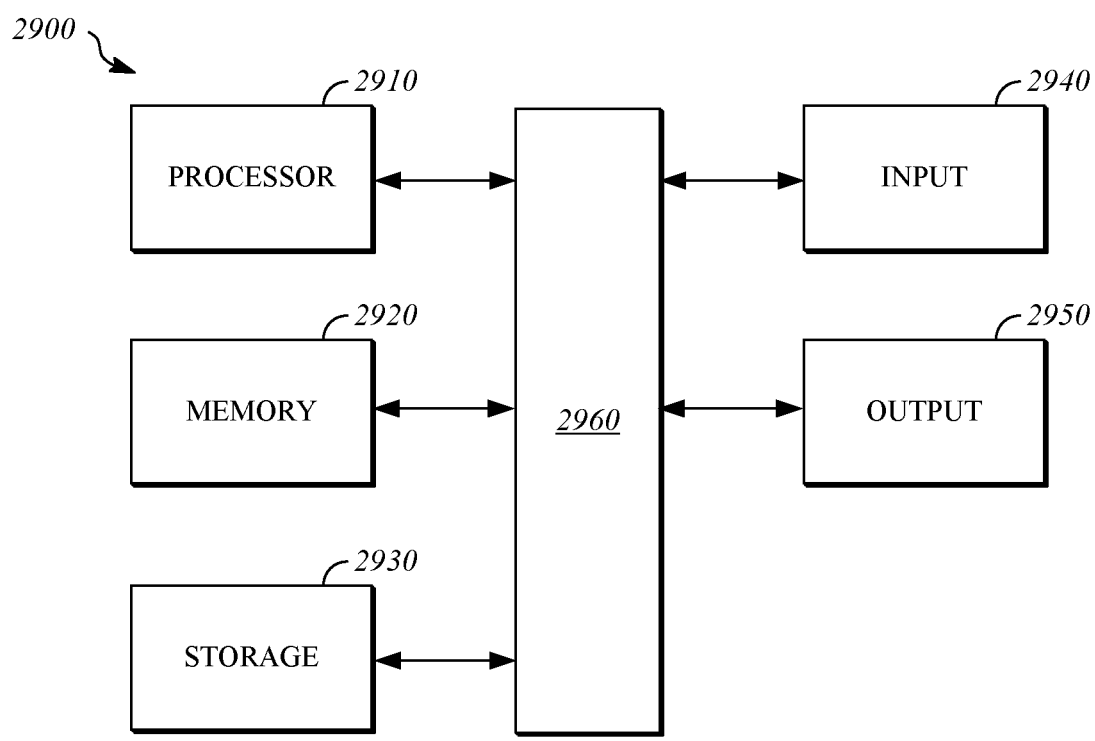
FIG. 29 is a block diagram that shows an exemplary hardware configuration for a controller.

FIG. 29 is a block diagram that shows an exemplary hardware configuration for a controller 2900 that may be used in the devices, assemblies, and methods described herein. For example, the controller 2900 can be used to implement the controller 306 of FIG. 3 to control operation of the system 305.

The controller 2900 may include a processor 2910, memory 2920, a storage device 2930, one or more input devices 2940, and one or more output devices 2950. The controller 2900 may also include a bus 2960 or a similar device to interconnect the components for communication.

The processor 2910 is operable to execute computer program instructions and perform operations described by the computer program instructions. As an example, the processor 2910 may be a conventional device such as a central processing unit. The memory 2920 may be a volatile, high-speed, short-term information storage device such as a random-access memory module. The storage device 2930 may be a non-volatile information storage device such as a hard drive or a solid-state drive. The input devices 2940 may include any type of human-machine interface such as buttons, switches, a keyboard, a mouse, a touchscreen input device, a gestural input device, or an audio input device. The output devices 2950 may include any type of device operable to provide an indication to a user regarding an operating state, such as a display screen or an audio output.

One example of an implementation of the foregoing disclosure is a method that includes receiving inputs from one or more input devices, and determining a user interest in use of the interface device based on the inputs. In response to the user interest, changing a state of the first interface device from a deactivated state in which the first interface device is concealed behind a surface to an activated state in which the first interface device emits light through the surface.

The method may also include outputting a location indication that indicates a position of the interface device to a user. In some implementations of the method, the location indication includes a sound indication. In some implementations of the method, the location indication includes a vibratory indication.

The method may also include ceasing output of the location indication after a predetermined time period. The method may also include determining a position for outputting the location indication based on a position of the user. The method may also include determining a position for outputting the location indication based on a gaze angle of the user. The method may also include outputting a user interface using the interface device. The method may also include determining a position for outputting the location indication based on a position of the user. The method may also include determining a position for outputting the location indication based on a gaze angle of the user.

Another example of an implementation of the foregoing disclosure is a method that includes determining a position of a user relative to multiple interface devices, receiving inputs from one or more input devices, and determining a user interest in use of the interface devices based on the inputs. The method also includes selecting a first interface device from the multiple interface devices based on the position of the user and changing a state of the first interface device from a deactivated state in which the first interface device is concealed behind a surface to an activated state in which the first interface device emits light through the surface.

The method may also include outputting a location indication that indicates a position of the interface device to a user. The method may also include outputting a user interface using the interface device.

Another example of an implementation of the foregoing disclosure is a method that includes determining a gaze angle of a user relative to multiple interface devices, receiving inputs from one or more input devices, and determining a user interest in use of the interface devices based on the inputs. The method also includes selecting a first interface device from the multiple interface devices based on the position of the user, and changing a state of the first interface device from a deactivated state in which the first interface device is concealed behind a surface to an activated state in which the first interface device emits light through the surface.

The method may also include outputting a location indication that indicates a position of the interface device to a user. The method may also include outputting a user interface using the interface device.

Another example of an implementation of the foregoing disclosure is a method that includes receiving a request for transfer of a user interface from a first interface device to a second interface device. In response to the input requesting transfer, the method includes ceasing display of the user interface at the first interface device, changing a state of the first interface device from an activated state in which the first interface device emits light through a first surface portion to a deactivated state in which the first interface device is concealed behind the first surface portion, changing a state of the second interface device from a deactivated state in which the second interface device is concealed behind a second surface portion to an activated state in which the second interface device emits light through the second surface portion, and displaying the user interface at the second interface device.

In some implementations of the method, the request for transfer includes a first gesture input made using the first interface device and a second gesture input made using the second interface device. In some implementations of the method, the request for transfer includes a first gesture input made using the first interface device, the first gesture input having a direction that corresponds to the second interface device.

What is claimed is:

1. An apparatus, comprising:
   a seating surface that is configured to support a user that is seated on the seating surface;
   an input device that is concealed behind the seating surface;

a wall panel surface; and a display device that has a deactivated state in which the display device is concealed behind the wall panel surface, has an activated state in which the display device emits light through the wall panel surface, and is located behind the wall panel surface such that the display device is not visible in the activated state, and wherein the input device is operable to control a user interface displayed by the display device when the display device is in the activated state.

2. The apparatus of claim 1, wherein the wall panel surface is a portion of an automotive interior.

3. The apparatus of claim 1, wherein the wall panel surface includes a textile material.

4. The apparatus of claim 1, wherein the wall panel surface includes a faux leather material.

5. The apparatus of claim 1, wherein the wall panel surface includes a wood veneer.

6. An apparatus, comprising:

a first surface wherein the first surface is a seating surface that is formed on a seat base;

a first interface device that is located behind the first surface;

a first input device that generates an input signal representing a user position, wherein the input signal indicates that the user position is located on the seat base and on a portion of the first interface device; and a controller, wherein:

the first interface device has a deactivated state in which the first interface device is concealed behind the first surface such that the first interface device is not visible, the first interface device has an activated state in which an active area of the first interface device emits light through the first surface, a user interface is displayed using the active area of the first interface device, and a portion of the first interface device outside of the active area does not emit light through the first surface, and the controller is operable to determine a location for the active area based on the user position as represented by the input signal.

7. An apparatus, comprising:

a first surface;

a first interface device that is located behind the first surface;

a first input device that generates an input signal; and a controller, wherein:

the first interface device has a deactivated state in which the first interface device is concealed behind the first surface such that the first interface device is not visible, the first interface device has an activated state in which an active area of the first interface device emits light through the first surface, a user interface is displayed using the active area of the first interface device, and a portion of the first interface device outside of the active area does not emit light through the first surface, the controller is operable to determine a location for the active area based on the input signal, and the first surface is a seating surface that is formed on a seat base, a user is sitting on the seat base, the user is sitting on a portion of the first interface device, and the controller determines the location for the active area based on the position of the user relative to the seat base.

\* \* \* \* \*